US007844562B2

(12) United States Patent
Gong et al.

(10) Patent No.: US 7,844,562 B2
(45) Date of Patent: Nov. 30, 2010

(54) METHOD AND KNOWLEDGE STRUCTURES FOR REASONING ABOUT CONCEPTS, RELATIONS, AND RULES

(75) Inventors: Leiguang Gong, Oakland, NJ (US); Leora Morgenstern, New York, NY (US); Erik T. Mueller, Chevy Chase, MD (US); Doug Riecken, Plainfield, NJ (US); Moninder Singh, Middletown, CT (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 12/261,541

(22) Filed: Oct. 30, 2008

(65) Prior Publication Data
US 2009/0055342 A1    Feb. 26, 2009

Related U.S. Application Data

(63) Continuation of application No. 10/316,588, filed on Dec. 11, 2002, now Pat. No. 7,447,667.

(51) Int. Cl.
*G06N 5/00* (2006.01)
(52) U.S. Cl. .......................................... 706/47; 706/45
(58) Field of Classification Search .................. 706/47, 706/45
See application file for complete search history.

(56) References Cited

U.S. PATENT DOCUMENTS 7,127,436 B2 * 10/2006 Xiao et al. .................... 706/13

OTHER PUBLICATIONS

Magnini, B., et al., User Modeling for News Web Sites with Word Sense Based Techniques, User Modeling and User-Adapted Interaction 14: 2004, pp. 239-257.*
Burke, Hybrid Recommender Systems: Survey and Experiments, User Modeling and User-Adapted Interaction, vol. 12, Issue 4, Nov. 2002, pp. 331-370.*
Hess, Trust-Based Recommendations for Publications: A Multi-layer Network Approach, TCDL Bulletin, vol. 2, Issue 2, 2006, pp. 1-12.*

* cited by examiner

*Primary Examiner*—Wilbert L Starks, Jr.
(74) *Attorney, Agent, or Firm*—F. Chau & Associates, LLC

(57) ABSTRACT

A system and method for reasoning about concepts, relations and rules having a semantic network comprising at least one node from a predetermined set of node types, at least one link from a predetermined set of link types, and zero or more rules from a predetermined set of rule types, a subset of the rule types being matching rule types, each node and each link being associated with a set of zero or more rules; a network reasoning data structure having a reasoning type database having at least one regular expression, each of the regular expressions being a class of sequences having at least three node types and two link types, wherein the network reasoning data structure further has a context being a set of rules; and a reasoning engine having an activator for activating one or more activated paths in the semantic network, the set of activated paths having a common starting node in the semantic network, wherein the reasoning engine further has a validator for selecting a subset of the activated paths being valid paths, each rule from the set of rule matching types that is associated with one or more path elements on each valid path being matched by one or more rules in the context and wherein the reasoning engine further has a legal inferencer for selecting a subset of the set of valid paths being legal and valid paths, the legal and valid paths matching at least one of the regular expressions.

11 Claims, 41 Drawing Sheets

Overview of Enhanced Semantic Network System

Overview of Enhanced Semantic Network System

Enhanced Semantic Network
Code Symbol: 7

Paths in Enhanced Semantic Network

Valid Paths in Enhanced Semantic Network

FIG. 10: Table characterizing legal paths in an ESNFLN

| Regular expressions for example legal paths | Example Corresponding Links |
|---|---|
| ((Node of Type 3)(link of Type 1))+ (Node characterized by defining formula 1)([any link][any node])* <u>10110</u> | Link of Type 2 <u>10210</u> |
| ((Node of Type 3)(link of Type 1))+ (Node of Type 5 )([any link][any node])* <u>10120</u> | Link of Type 2 <u>10220</u> |
| (Node of Type 2)(link of Type 3 or link of type 2))* (Node of Type 2) (link of Type 2) (Node of Type 5 or Node of Type 4) <u>10130</u> | Link of Type 4 <u>10230</u> |
| (Node of Type 5)(link of Type 2) (Node of Type 3 or Node of Type 4)* (any link)(Node of Type7) (link of Type 7) (any node) <u>10140</u> | Link of Type 1 <u>10240</u> |

Legal Valid Paths in
Enhanced Semantic Network

FIG. 14: Table with Sample legal paths in an E-commerce Planning Semantic Network

| Sample Legal Path in Planning Network | Sample Corresponding Link |
|---|---|
| (situation)(triggers)(need)((implies)(need))*(served by)(product purchase)((subsumes)(product purchase))* <br> 14110 | recommends <br><br> 14210 |
| (behavior)((retroduct)or (causes))(situation)(triggers)(need)((isa)need))*(served by)(product purchase.)((subsumes)(product purchase))* <br> 14120 | recommends <br><br> 14220 |
| (product purchase)(causes)(situation)((implies)(situation))*(triggers)(need)((isa)(need))*(served by)(product purchase).((subsumes)(product purchase))*    14130 | cross-sell from product purchase <br><br> 14230 |
| (product purchase) (causes) (situation) ((implies)(situation))* <br> 14140 | hypothetical consequence <br><br> 14240 |

FIG. 16: Concrete Example of E-commerce PSN

FIG. 17: Inference in an E-commerce PSN

FIG. 24: Using Weights: Before Inference

FIG. 25: Using Weights - After Inference

FIG. 26: Flowchart for Computing Weights

Sequence of Display Units as Permutation of Reasoning Unit: Example 3 (order reversing)

| Reasoning Unit | Display Unit | Result of Permutation |
|---|---|---|
| Reasoning Unit 1 32110 | Display Unit 1 | Display Unit n 32310 |
| Reasoning Unit 2 32120 | Display Unit 2 | Display Unit n-1 32320 |
| Reasoning Unit 3 32130 | Display Unit 3 | Display Unit n-2 32330 |
| ......... | ......... | ......... |
| Reasoning Unit k 32150 | Display Unit k | Display Unit n-k+1 32350 |
| Reasoning Unit n-1 32180 | Display Unit n-1 | Display Unit 2 32380 |
| Reasoning Unit n 32190 | Display Unit n | Display Unit 1 32390 |

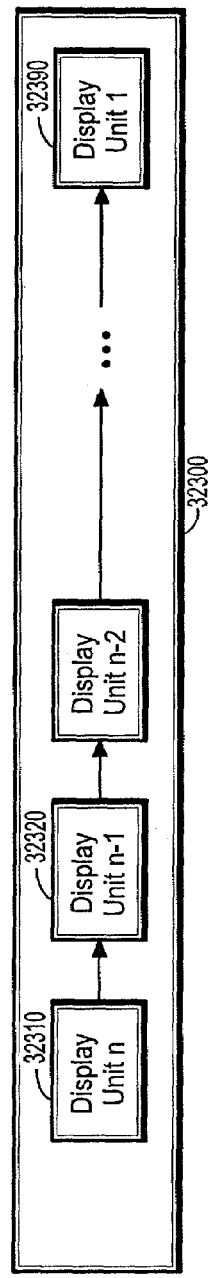

Example of Correspondence Between Reasoning Paths and Regular Expressions

| 33100 | Reasoning Path Set | Corresponding Regular Expression | |
|---|---|---|---|
| 33110 | Reasoning Path 1 | 33210 | Regular Expression 3 |
| 33120 | Reasoning Path 2 | 33220 | Regular Expression 5 |
| 33130 | Reasoning Path 3 | 33230 | Regular Expression 3 |
| 33140 | Reasoning Path 4 | 33240 | Regular Expression 2 |
| 33150 | Reasoning Path 5 | 33250 | Regular Expression 2 |
| 33160 | Reasoning Path 6 | 33260 | Regular Expression 1 |
| | ......... | | ......... |
| 33190 | Reasoning Path 22 | 33290 | Regular Expression 1 |

| Resoning Type DB 33200 |
|---|
| Regex 1 Regex 2 Regex 3 Regex4 Regex5 |

| | |
|---|---|
| concept: | Customer has ample available cash —36110 |
| relation: | Triggers —36120 |
| concept: | Need to invest cash in high-yielding returns —36130 |
| relation: | Served by —36140 |
| concept: | Investment Products —36150 |
| relation: | Subsumes —36160 |
| concept: | Tax-free or lowered bonds —36170 |

<u>36100</u> Reasoning Path

| | |
|---|---|
| concept: | Customer has a car —36310 |
| relation: | Triggers —36320 |
| concept: | Need to insure car —36330 |
| relation: | Served by —36340 |
| concept: | Comprehensive/Collision—36350 |

<u>36300</u> Reasoning Path

FIG. 36

Transformation Table --- Forward Reasoning x Triggers y - -→ We see that you have (x -first two words); therefore you y. -37110
x Served by y - -→ Your x might be served by purchasing x -37120
x Subsumes y - -→ One type of x is y -37130

37100

Transformation Table --- Backward Reasoning

<product> <endpath> - -→ We are recommending x because -37210
x Served by y - -→ y serves your x -37220
x Subsumes y - -→ y is a type of x -37230
x Triggers y - -→ You y because you have (x - first two words) -37240

Box 38100:
We see that you have ample available cash; (38110)
Therefore you need to invest cash in high-yielding returns (38120)
Your need to invest cash in high-yielding returns might be served by purchasing investment products (38130)
One type of investment products is tax-free of tax-lowered bonds (38140)

Box 38200:
We are recommending tax-free or tax-lowered bonds because (38210)
tax-free or tax-lowered bonds is a type of investment products (38220)
investment products serves your need to invest cash in high-yielding returns (38230)
You need to invest cash in high-yielding returns because you have ample available cash (38240)

Box 38300:
We are recommending comprehensive/collision insurance because (38310)
comprehensive/collision insurance serves your need to insure car (38320)
You need to insure car because you have a car (38330)

Sample display sequences

FIG. 38

METHOD AND KNOWLEDGE STRUCTURES FOR REASONING ABOUT CONCEPTS, RELATIONS, AND RULES

CROSS-REFERENCE TO RELATED APPLICATION

This is a Continuation Application claiming the benefit of U.S. patent application Ser. No. 10/316,588, filed on Dec. 11, 2002, now U.S. Pat. No. 7,447,667, the entire contents of which are each hereby incorporated by reference herein in their entirety.

FIELD OF THE INVENTION

This invention relates to a method and knowledge structures for reasoning about concepts, relations, and rules.

BACKGROUND OF THE INVENTION

A semantic network is a structure for representing information. Semantic networks can encode information about a business, an area of study, or common sense knowledge. For example, a semantic network could encode information about a bank's products and services.

The basic building blocks of a semantic network are links and nodes. A node typically represents a concept or set of concepts, or an object or set of objects. For example, a node in a semantic network encoding information about a bank's products could represent the class of all checking accounts, while another node could represent the price (fee) of a particular class of products such as checking accounts. Abstract concepts are often referred to as properties or attributes.

A link relates two nodes. A link may represent any binary relation, that is, any relation that connects two objects or concepts or an object and a concept. For example, in the example above, one could specify a link representing a "has feature" relation, between a node representing a subclass of checking accounts and a node representing a customer's ability to perform transactions over the internet.

Proponents of semantic networks have suggested that semantic networks can be used not only to represent information but also to reason with that information. (See A. Barr and E. Feigenbaum (eds.): AI Handbook, volume I, pages 80-89, which is herein incorporated by reference in its entirety.) For example, consider FIG. 1. FIG. 1 represents a semantic network that encodes some information about the animal kingdom (pandas are mammals; cats are mammals, mammals are lactating creatures) as well as some information about Bill's visit to the Bronx Zoo. This network encodes the information that a person named Bill sees an individual named Penny and that Penny is a panda. If one conjoins this information in the network with the information in the network that pandas are a subclass of mammals, one should then be able to conclude that Bill sees a mammal. Indeed, this piece of reasoning in a semantic network corresponds to following a path in the semantic network. In FIG. 2, the path corresponding to this reasoning is outlined in bold.

Researchers have noted, however, that one can easily misuse a semantic network to make invalid conclusions while reasoning. (See, for example, W. Woods, "What's in a Link" in D. Bobrow and A. Collins: *Representation and Understanding*, Morgan Kaufmann, San Francisco 1975, which discusses a variety of problems that arise when naively reasoning with a semantic network. This reference is herein incorporated by reference in its entirety.) Indeed, it is not even clear how a path in a semantic network is supposed to correspond to reasoning with the information in that semantic network. For example, consider FIG. 3, which depicts the semantic network of FIG. 1, with another path outlined in bold. Although we have the information that Bill sees Penny, and Penny is a panda, and pandas eat bamboo and bamboo is a type of grass, one cannot conclude that Bill sees Penny eating bamboo, or that Bill sees grass.

That is, if one simply takes an arbitrary path in a semantic network, and extrapolates that a link in a segment of the path corresponds to a larger portion of the path, one can easily jump to conclusions that are not sound.

There have been a variety of attempts to explore how one can reason soundly within a semantic network. In particular, researchers have studied how one can reason within a subtype of semantic networks known as inheritance networks.

Inheritance networks focus on two link types of interest, known as the is a and inst links. The is a link connects nodes A and B if the class (set) of objects that A represents is a subset of the set of objects that B represents. For example, if node A represents the set of all Coverdell accounts and node B represents the set of all college savings accounts, then A is a B (since all Coverdell accounts are used to save for college). The inst link connects nodes A and B if the objects that A represents is a member of the set of objects that B represents. For example, if A represents the checking account 226070584-404-9962899 and B represents the set of all checking accounts in Apple Bank, then A inst B (commonly read as "A is an instance of B").

The is a and inst links are generally used to describe taxonomic hierarchies. Classic examples of taxonomic hierarchies are the plan and animal kingdoms, small fragments of which appear in FIG. 1. There are many other examples in all sorts of aspects of everyday life and business applications. For example, a bank's products can be viewed as a taxonomic hierarchy; e.g., different types of free checking accounts form a subclass of checking accounts, which form a subclass of bank accounts. Many taxonomic hierarchies allow for classes to have multiple superclasses. For example, interest-bearing checking accounts have both interest-bearing accounts and checking accounts as superclasses.

Reasoning in a pure taxonomic hierarchy is simple. One can define paths in the following manner: If one considers an inheritance hierarchy as a directed acyclic graph (DAG), then in most inheritance hierarchies, A is a leaf of the DAG if there is an inst link between A and B. A is a parent of B if there is an inst or is a link from B to A.

Ancestor is defined recursively as follows: A is an ancestor of B if A is a parent of B; A is an ancestor of B if there is some node C such that A is an ancestor of C and C is a parent of B. A is a root node if A has no ancestors.

One can now elaborate the notion of a path in an inheritance hierarchy. There is a path between A and B (written A d B) if one of the following conditions holds: (i) There is an inst or is a link between A and B, or (ii) There is some node X such that A d X and there is an inst or is a link between X and B. If there is a path between A and B, we can say that A is a member or a subclass of B.

Researchers have studied a variant of inheritance networks known as inheritance networks with exceptions (IHE). In a classic IHE, there are three link types of importance: the inst link, the defeasible is a link, and the defeasible cancels link. The inst link is the same type of link as in classic inheritance networks. Intuitively, there is a defeasible is a link between nodes A and B if the class of objects that A represents is "close-to" a subset of the set of objects that B represents. That is, if x is a member of the class A, then it is typically the case that x is a member of the class B. In the same manner, there is a defeasible cancels link between A and B if members of the class A are typically not members of the class B. These links are important because they allow specifying and reasoning with exceptions.

In an inheritance hierarchy with exceptions, one wishes to reason about whether or not the members of a class X typically are or are not members of a class Y. To do that, one must determine whether or not there is a positive or negative path between X and Y. This question has been studied in depth by the following references, among others: John F. Horty, Richmond H. Thomason, David S. Touretzky: *A Skeptical Theory of Inheritance in Nonmonotonic Semantic Networks*. Artificial Intelligence 42(2-3): 311-348 (1990), Lynn Andrea Stein: *Resolving Ambiguity in Nonmonotonic Inheritance Hierarchies*. Artificial Intelligence 55(2): 259-310 (1992). These references are herein incorporated by reference in their entirety.

Inheritance networks and inheritance networks with exceptions allow a very limited type of reasoning: determining whether X is a member or subclass of Y or whether members of a class X typically are or are not members of a class Y. There have been various attempts in the prior art to broaden the types of reasoning that is allowed within a semantic network: By clever choices in representation, one can use inheritance hierarchies and inheritance hierarchies with exceptions to reason about whether or not an object has a certain property. One can do this by reifying a property as a class—that is, the class of objects that have the property in question. For example, to represent the fact that cars have 4 wheels, one can create two nodes, a node representing the class of all cars, and a node representing the class of all things that have 4 wheels, and then drawing an is a link between the first and second nodes. In such a manner, one could, for example, construct a semantic network that allows one to reason that all Volvo station wagons and all Buick coupes have 4 wheels. More generally, one can reason about the "slots" that an object or class of objects can have and the "fillers" for these slots. For example, one can reason about the price, cylinders, options, and other properties of cars. This technique is used to represent information in such languages as KL-ONE, which is based on the concept of a classic inheritance network. There has been inquiry into a class of semantic networks known as description logics, which use this technique extensively. The bottom line, however, is that such semantic networks still allow only very limited reasoning. They are designed to answer two types of questions: "Is class A a member of class B?" (the subsumption question) and "Where in a semantic network does a particular class A belong?" (the classification question). These are not general semantic networks; they are inheritance networks, and they do not allow general reasoning.

Morgenstern has investigated inheritance networks with exceptions in which logical formulas are attached to nodes. These logical formulas can be thought of as representing rules. Intuitively, a formula p is attached to a node A if it is the case that the formula p is typically true at the state of affairs represented by node A. For example, for an inheritance hierarchy representing reimbursement for medical insurance purposes, one might have a node A representing the class of all surgical procedures and a formula p saying that 90% of the cost of surgical procedures is covered. This means that typically, 90% of the cost of a surgical procedure is covered. However, there may be exceptions: emergency surgery may be covered in full, while cosmetic surgery may not be covered at all. Morgenstern's work focuses on determining what sets of formulas apply (can be considered true) at a particular node of the network. The work applies to inheritance networks with exceptions, but not to general semantic networks. General reasoning is not considered. Norvig has examined the problem of trying to understand a story using a semantic network. He has developed a system that processes a story and constructs an ad-hoc semantic network which represents information in that story. He then identifies path shapes which correspond to syntactical and semantical natural language operations. A path shape can become a candidate for a potential inference. Off-line techniques which do not refer back to the semantic network are then used to determine which of these potential inferences can be made safely. The method is neither sound (that is, paths corresponding to incorrect inferences are identified, as in the example of FIG. 3), nor general. See: R. Brachman and H. Levesque: *The Tractability of Subsumption in Frame-Based Description Languages*, Proceedings of the National Conference on Artificial Intelligence, 1984, 34-37. R. Brachman et al.: *The CLASSIC Knowledge Representation System or, KL-ONE: The Next Generation*. FGCS1992: 1036-1043, L. Morgenstern: Inheritance Comes of Age: *Applying Nonmonotonic Techniques to Problems in Industry*, Artificial Intelligence, 103(1-2), 237-271 (1998), L. Morgenstern, IBM Patent: U.S. Pat. No. 5,802,508, Sep. 1, 1998: Reasoning with rules in a multiple inheritance semantic network with exceptions P. Norvig: *Marker Passing as a Weak Method for Text Inferencing*, Cognitive Science, 13 (4), 569-620 (1989), and R. Brachman and J. Schmolze: *An Overview of the KL-ONE Knowledge Representation System*, Cognitive Science 9 (2), 171-216 (1985). These references are herein incorporated by reference in their entirety.

Businesses often need to have some method to recommend products or services to their customers. For example, a bookstore might wish for a way to determine which books to recommend to its customers. In e-commerce applications, in which there is little or no personal interaction between the enterprise and the customer, such a system is particularly important. An automated system that can make such recommendations is known as a recommendation system.

Most recommendation systems work on a principle known as collaborative filtering. The idea of collaborative filtering is that one can assign an individual to a particular group based on his preferences—which can be elicited by direct questioning, or inferred by observing a customer's purchase or browsing behavior—and then determine which products or services might suit a customer by looking at the purchasing patterns of other members in the group.

An example of a recommendation system using collaborative filtering is the one used by amazon.com. If a user searches for a particular book, the system will suggest other books purchased by customers who were also interested in the book for which the user searched. For example, if one searches for Michael Shaara's *The Killer Angels* (a Pulitzer-Prize-winning account of the Battle of Gettysburg), amazon.com will suggest books by, among others, Joshua Lawrence Chamberlain, Shelby Foote, and Bernard Malamud. Some of these recommendations are closely related to the original request. For example, Joshua Lawrence Chamberlain wrote memoirs about his experiences in the Civil War; similarly, Shelby Foote writes about the Civil War. However, some of these recommendations—e.g. Malamud—do not seem to match well. It is important to note that collaborative filtering offers no way of explaining its recommendations; all a system can say is that other customers, grouped according to some clustering algorithm, showed interest in or purchased some item. See J. Breese, D. Heckerman, C. Kadie: *Empirical Analysis of Predictive Algorithms for Collaborative Filtering*, Proceedings of the Fourteenth Conference on Uncertainty in Artificial Intelligence, 1998, Morgan Kaufmann, San Francisco. This reference is herein incorporated by reference in its entirety.

Some recommendation systems are rule based, with rules coming from static customer profiles and transactional data (e.g. Broadvision at their website). A business manager can set up rules to recommend products based on conditions he chooses. For example, a business manager could set up rules saying that if a customer takes out a mortgage, one should recommend home insurance for that customer or that if a customer is affluent, one should recommend various tax shelters. Such rule-based systems, however, are often hard to maintain and update (as opposed to model-based systems). Rules may interact with one another in unexpected ways, sometimes even producing inconsistency. Updating one rule may require updating many other rules.

It has long been recognized that while classical logic is binary—statements are either true or false—real life reasoning is many-valued. That is, we reason that a statement is probably true, or unlikely, or true with a certain probability or certainty. Such considerations led to the development of probabilistic reasoning methods in computer systems, starting in the 1960s and 1970s. A well-known example is Shortliffe's MYCIN system, which used certainty factors to facilitate the diagnosis and treatment of bacterial infections.

A more formal treatment of probabilistic reasoning became popular in the 1980s. We begin by introducing several basic concepts. The prior probability of a statement, event, or hypothesis H, P(H) is the probability that H is true. The posterior or conditional probability of a statement or hypothesis H relative to some evidence E, P(H|E), is the probability that H is true given that B is already known to be true. If P(H|E)=P(H) we say that H and E are independent. If P(H|E1; E2)=P(H|E2) we say that H and E1 are conditionally independent given E2. The joint probability of H1 and H2, P(H1; H2), is the probability that both H1 and H2 are true at the same time. The chain rule relates these concepts. Specifically, the chain rule states that P(H1; H2; ... Hn)=P(Hn|Hn−1 ... H1) ... P(H2|H1) P(H1). A corollary of this rule is Bayes's Rule: P(H|E)=P(E|H)P(H)/P(E).

The chain rule and Bayes's rule allow the determination of certain conditional probabilities from prior probabilities and other conditional probabilities. It is often the case that the particular calculation of a conditional probability is simplified due to the independence or conditional independence of some of the variables. The conditions under which calculations are simplified can often be represented in an intuitive way in a graphical structure.

A Bayesian network is a graphical representation of events and prior and conditional probabilities. Such networks have become an increasingly popular way of implementing probabilistic reasoning. A Bayesian network comprises nodes and links; nodes represent variables, and the links between nodes represent an explicit conditional dependence between variables. Some prior and conditional probabilities are furnished. Variables can represent facts or events. For example, the Bayesian network in FIG. 4 contains nodes representing such states as the sprinkler being on, rain, the presence of El Nino, the pavement being wet, and the grass being wet. The Bayesian network in FIG. 4 contains links, including a link between El Nino and rain, a link between rain and wet grass, a link between sprinkler and wet grass, and a link between sprinkler and wet hose. The Bayesian network in FIG. 4 contains assigned probabilities, including prior probabilities on some of the nodes (e.g., a prior probability of 5% on Cloud Seeding, 20% on El Nino) and conditional probabilities on some of the links (e.g., a conditional probability of 40% of Rain given El Nino).

This network can be used to infer a range of conditional probabilities: e.g., the probability that it had rained given (1) that the grass was wet, or (2) that the grass was wet but the pavement was dry or (3) that the grass was wet and el nino was present. Research has investigated methods to perform such inference with relative efficiency.

Bayesian networks are a powerful method of reasoning with probabilities. However, Bayesian networks have limited representational power. In particular, there is no semantics on the links between nodes, other than conditional probabilities. There are a few limited exceptions. For example, if the conditional probability between two nodes is sufficiently high—that is, if P(A|B) passes a certain threshold—it may be reasonable to say that B causes A. However, Bayesian networks do not in general allow assigning user-defined semantics to links between nodes. See E. Charniak: *Bayesian Networks Without Tears*, AI Magazine, 12(4), 50-63, 1991. This reference is herein incorporated by reference in its entirety.

The following useful theoretical concepts will assist in the understanding of the invention. A regular expression is an algebraic formula whose value is a pattern comprising a set of strings. This set of strings is called the language of the regular expression. Such a language is called a regular language.

Regular expressions can be characterized in a variety of ways. Most simply, a regular expression can be characterized in terms of its formation rules. Assume an alphabet A of symbols. The regular expressions over A are defined recursively as follows: The empty set is a regular expression; The empty string is a regular expression; For each symbol a in A, {a} is a regular expression; If x and y are regular expressions, then x|y is a regular expression; If x and y are regular expressions, then xy is a regular expression; and If x is a regular expression than x* is a regular expression. Examples of regular expressions are (for the English alphabet) the set of all words having 2 a's, or ending in x, or (for the English alphabet plus the digits 0-9) the set of all Pascal or Java identifiers. Regular expressions are equivalent in expressive power to finite automata. More precisely, a language can be generated by a regular expression if and only if it can be accepted by a finite automaton. See: J. Hopcroft and J. Ullman, 1979: *Introduction to Automata Theory, Languages, and Computation*, Addison Wesley, Reading, Mass. pp. 28-35, 55-76, 350-353. This reference is herein incorporated by reference in its entirety.

A well-formed formula (wff) or logical formula is defined in the following manner:

1. ~("not") and v ("or") are basic logical constants,
2. A term is defined as
   a. a non-logical constant
   b. f(t1, ... , tn) where f is an n-ary function and each ti is a term,
3. An atomic formula is an expression comprising either of a propositional constant, or of the form P(s1, ... , sn) where P is a n-ary predicate and each si is a term,
4. A well-formed formula is either an atomic formula or is built up from one or more atomic formulas by a finite number of applications of the following rules:
   (i) If p is a well-formed formula then ~p is a formula
   (ii) If p and q are well-formed formulas, then p v q is a well-formed formula
   (iii) If p is a well-formed formula and x is a variable, then (¼x)p and (½x) p are well-formed formulas.

Well-formed formulas are often represented as if-then rules, but need not be. They can be used to define concepts, to give necessary and/or sufficient conditions, or to provide information. See: B. Mates, *Elementary Logic*, Second Edition, Oxford University Press, 1979, Chapter 3. This reference is herein incorporated by reference in its entirety.

There are various problems and issues that the prior art does not address. For example, the prior art does not solve the problem of determining sound (correct) logical inferences within a semantic network.

The prior art cannot express or reason with semantic networks in which rules are attached to links and nodes of the network.

The prior art does not recognize that rules attached to nodes in semantic networks can be categorized as definition, prerequisite, or auxiliary rules, each type being interpreted differently when reasoning in the network.

The prior art does not recognize that the inferences that are performed within a semantic network must be valid with respect to a particular context.

The prior art cannot express or reason with semantic networks in which weights (probabilities) are attached to formulas on links and nodes in the network.

The prior art cannot furnish explanations for inferences within a semantic network in which rules are attached to links and nodes in the network.

What is needed is a method incorporating knowledge structures for reasoning about concepts, relations, and rules that addresses the above problems.

SUMMARY OF THE INVENTION

This invention comprises an enhanced semantic network system and a method for reasoning with this enhanced semantic network.

The enhanced semantic network system comprising first, an enhanced semantic network, a new type of semantic network that represents concepts and relations, as well as rules that give further information about these concepts and relations; second, a network reasoning data structure, a new data structure that represents a set of reasoning types and a set of specific rules, and third, a reasoning engine that activates a subset of paths in the network and determines which of these paths are legal and valid with respect to the rules in the context.

The method for reasoning in the semantic network comprising determining the starting nodes of potential reasoning paths by checking, using a theorem prover, whether the formulas that define a node are true with respect to a context, determining the subset of these paths that are legal paths which correspond to the regular expressions reasoning types in the network reasoning data structure, and traversing each legal path, determining as the path is traversed, using a theorem prover, whether the prerequisites of each legal path are satisfied in the context. An embodiment of the present invention further comprises a server system and method for displaying reasoning paths which correspond to regular expressions in a reasoning type database.

These features and embodiments of the present invention will become apparent from the following detailed description of illustrative embodiments thereof, which is to be read in connection with the accompanying drawings.

BRIEF DESCRIPTION OF THE DRAWINGS

FIG. 10 shows a sample table characterizing legal paths in an Enhanced Semantic Network.

FIG. 14 is a table showing three examples of legal paths and corresponding direct links that can substitute for these paths.

FIG. 32 depicts a display sequence whose order corresponds to a reverse ordering of reasoning units in a corresponding reasoning path.

FIG. 33 depicts a sample table showing a set of reasoning paths and corresponding reasoning type database.

FIG. 36 depicts two examples of reasoning paths in an e-commerce setting.

FIG. 37 depicts two example transformation tables that can be used by a content transformer to transform subsequences of reasoning paths to subsequences of display sequences.

FIG. 38 depicts display sequences that would be returned by using the transformation tables of FIG. 37 on the reasoning paths of FIG. 36.

DETAILED DESCRIPTION OF PREFERRED EMBODIMENTS

FIGS. 1 through 4 are illustrative of the prior art and were discussed in detail above. Embodiments of the present invention are now described in detail with reference to FIGS. 5 through 41.

Figure 1:
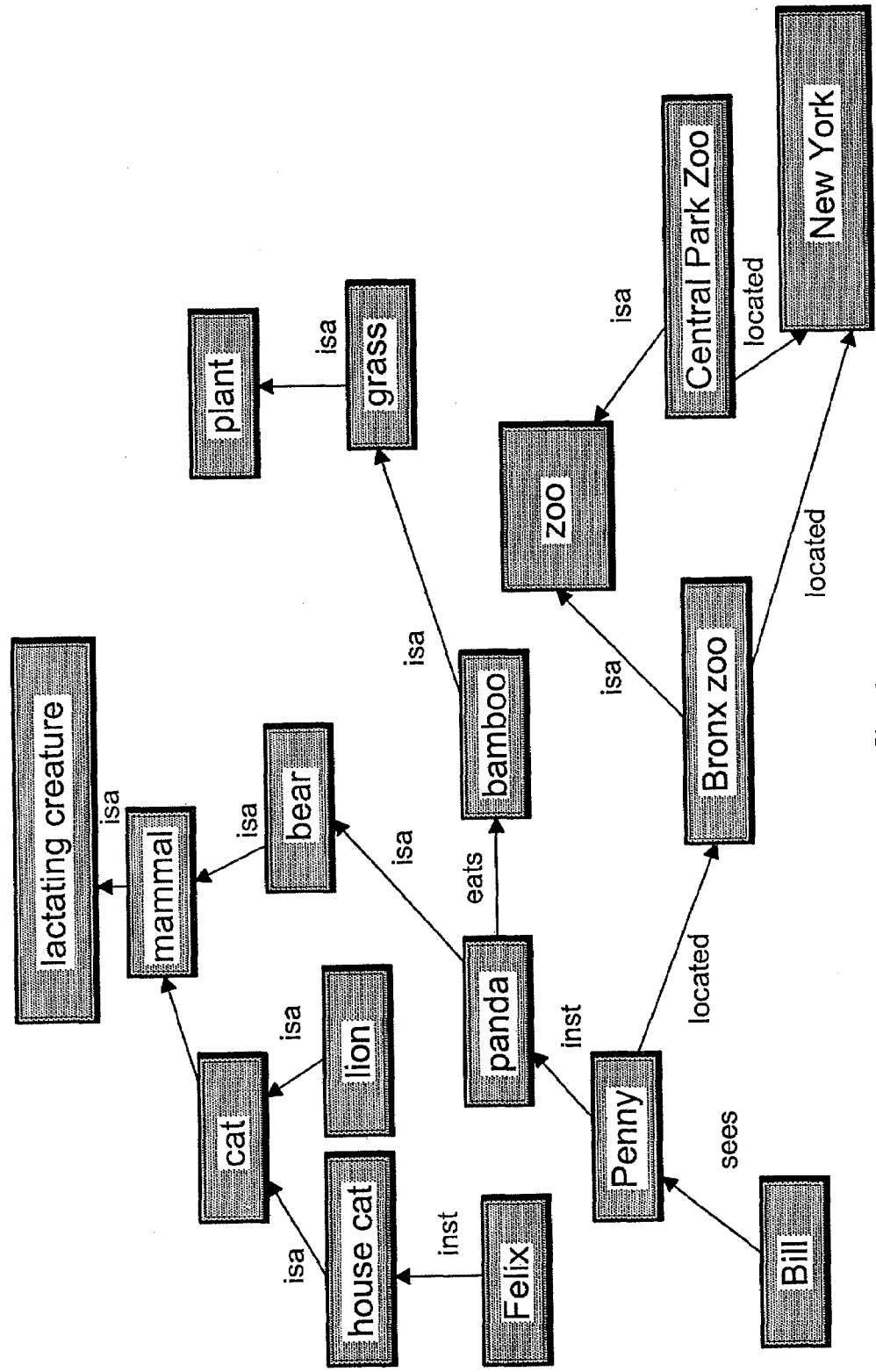
FIG. 1 is an illustration of a prior art semantic network that encodes some information about the animal and plant kingdoms and specific individuals in the animal kingdom.
Figure 2:
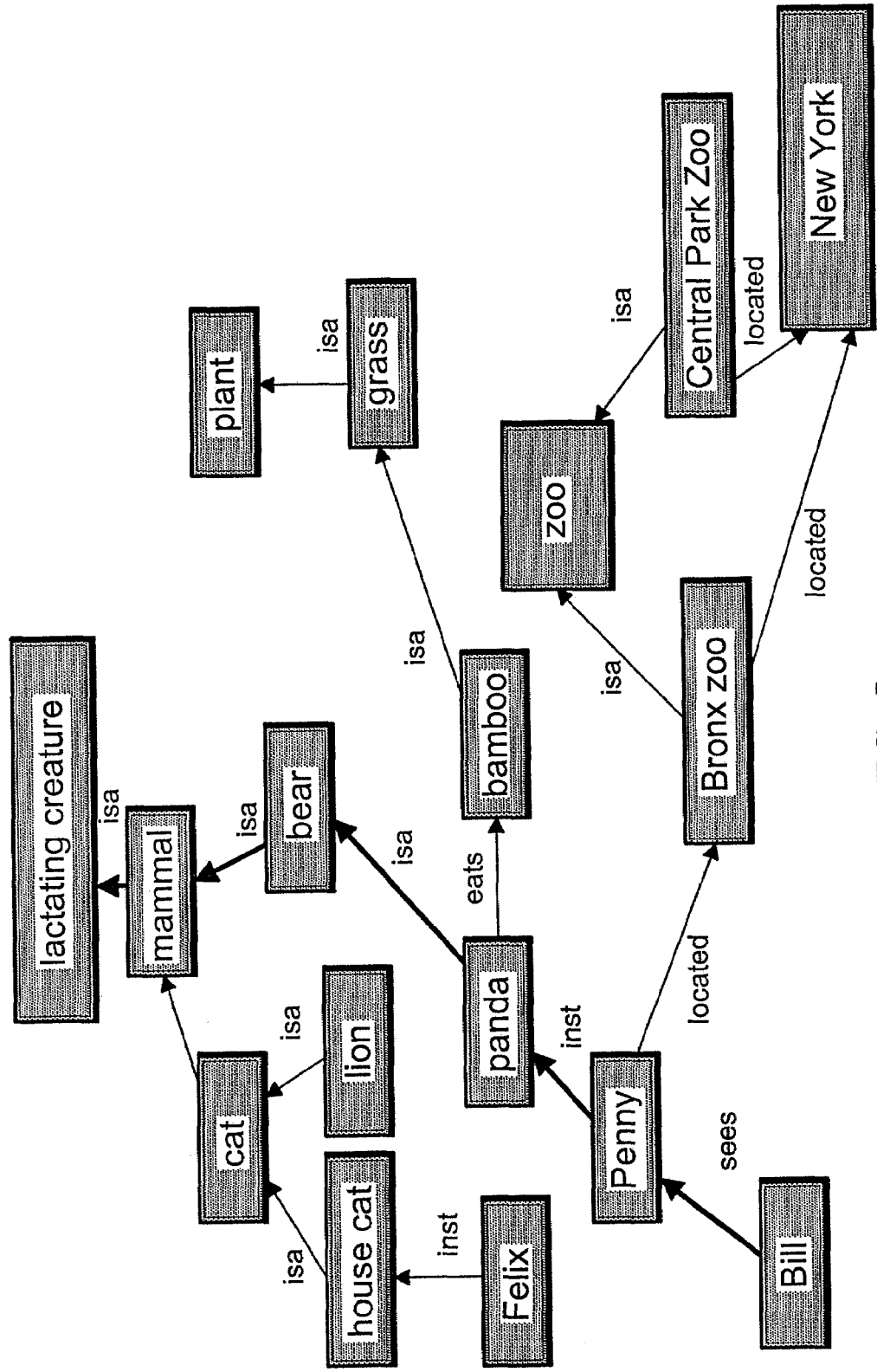
FIG. 2 is an illustration of an example path in a prior art semantic network which corresponds to a valid instance of reasoning.
Figure 3:
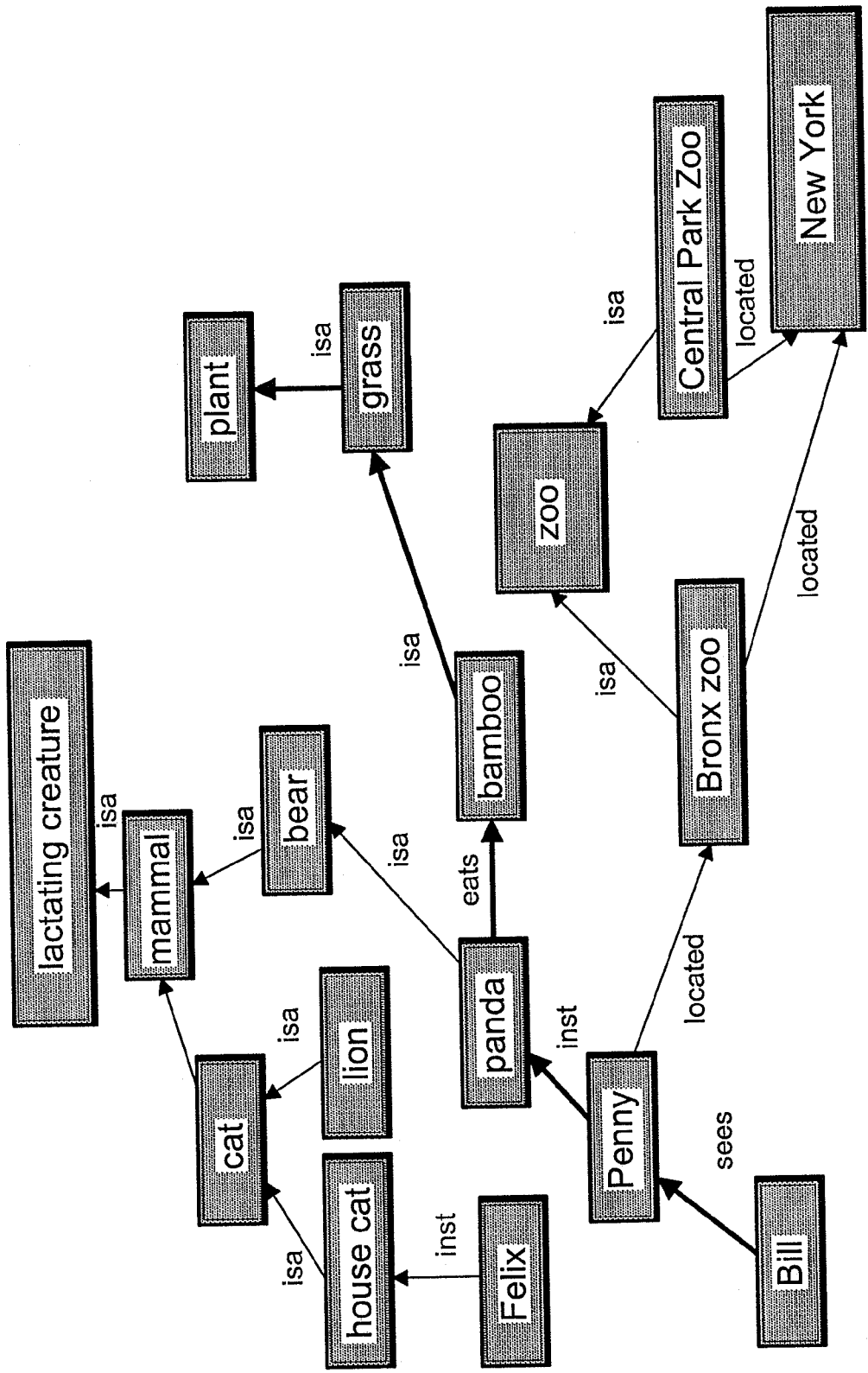
FIG. 3 is an illustration of an example path in a prior art semantic network which can be interpreted to correspond to invalid (unsound) reasoning.
Figure 4:
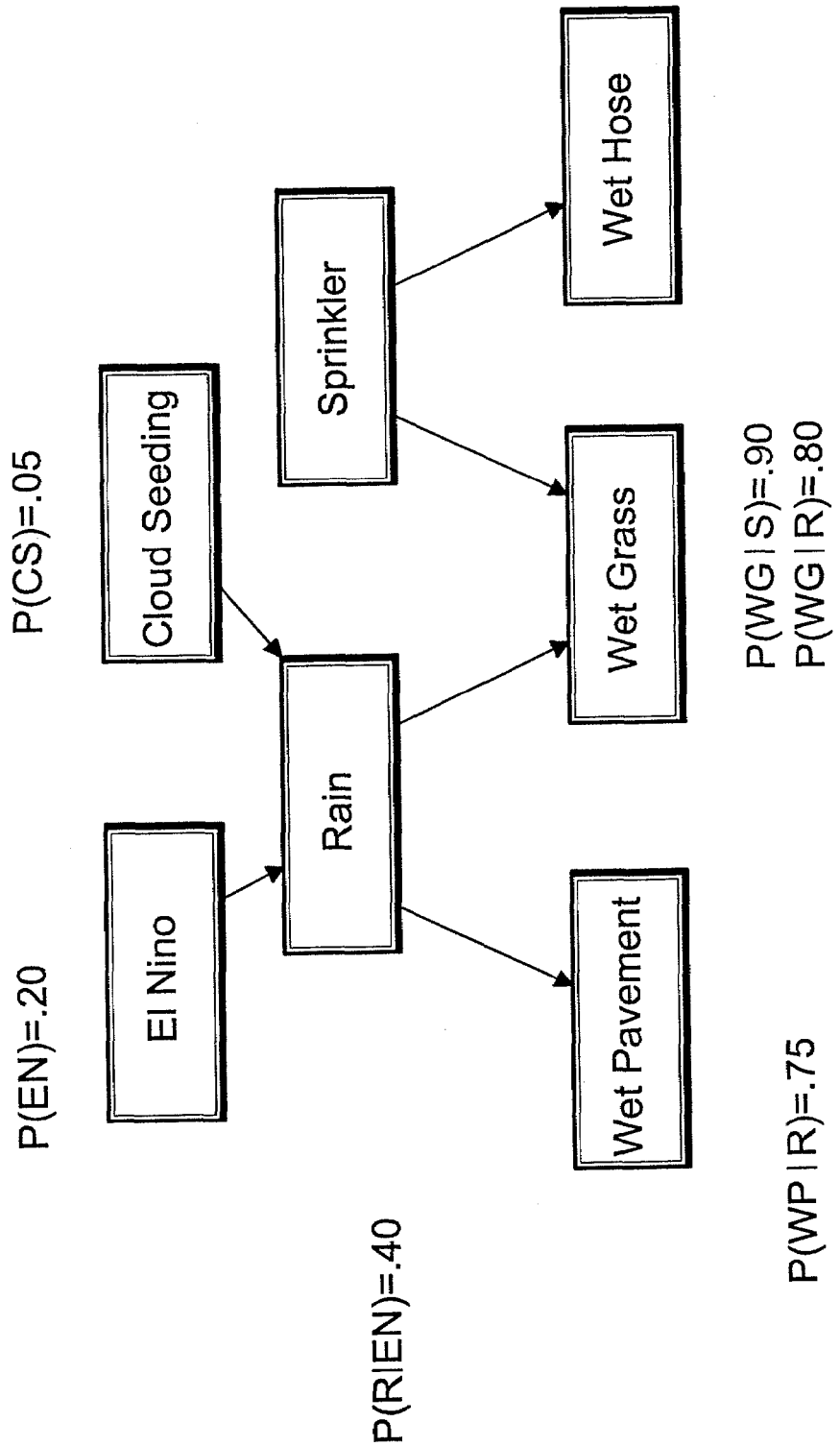
FIG. 4 is an illustration of a prior art Bayesian network, containing nodes, links, and prior and conditional probabilities.
Figure 5:
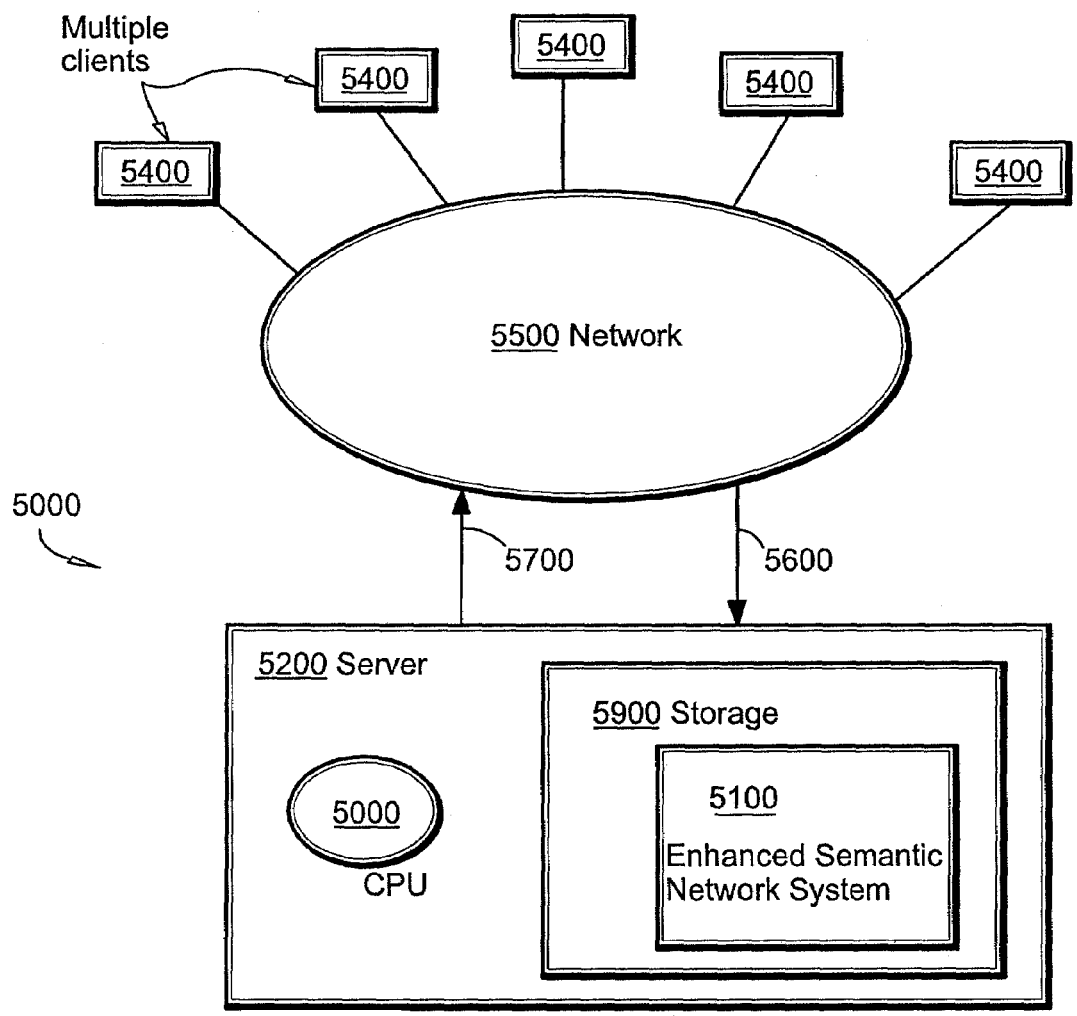
FIG. 5 depicts a general system description according to an embodiment of the present invention.

FIG. 5 is a block diagram that illustrates a computer processing system (5000) to which the present invention may be applied according to an embodiment of the present invention. The system comprises an enhanced semantic network system (5100). This instantiation of the enhanced semantic network system is used for reasoning about needs, products and situations; in general, enhanced semantic network systems can be used to reason about general concepts, relations, and rules. This enhanced semantic network system (5100) runs on a server (5200). The server (5200) is coupled to multiple clients or customers (5400) across a network (5500). The multiple customers (5400) make requests (5600) to the server (5200) and the server (5200) responds to requests (5600) by sending a response (5700) for each request made. The network (5500) is an electronic commerce network, which may comprise a subset of the World Wide Web. The server (5200) includes at least one processor (CPU) (5800) for coordinating and controlling the server (5200) and for performing the necessary computations for generating responses to requests using the enhanced semantic network system (5100). The storage system (5900) acts as a repository for the enhanced semantic network system (5100) and may comprise of one or more of main memory, cache memory or a disk drive subsystem (e.g. magnetic, optical).

The system (5100) can be adapted to run various applications, such as, but not limited to, a banking application. When a customer who has access to the server (5200) via the network (5500) concerning a specific customer need or situation, the system (5100) can reason with the given need or situation using knowledge available to it or acquired from the customer to infer additional needs and/oand suggest suitable products to satisfy those needs and/or situations. For example, the system (5100) can suggest various investment products to a customer who has a large amount of cash in his checking account. Enhanced semantic networks, according to embodiments of the present invention, are described in greater detail in FIGS. 6-41.

Figure 6:
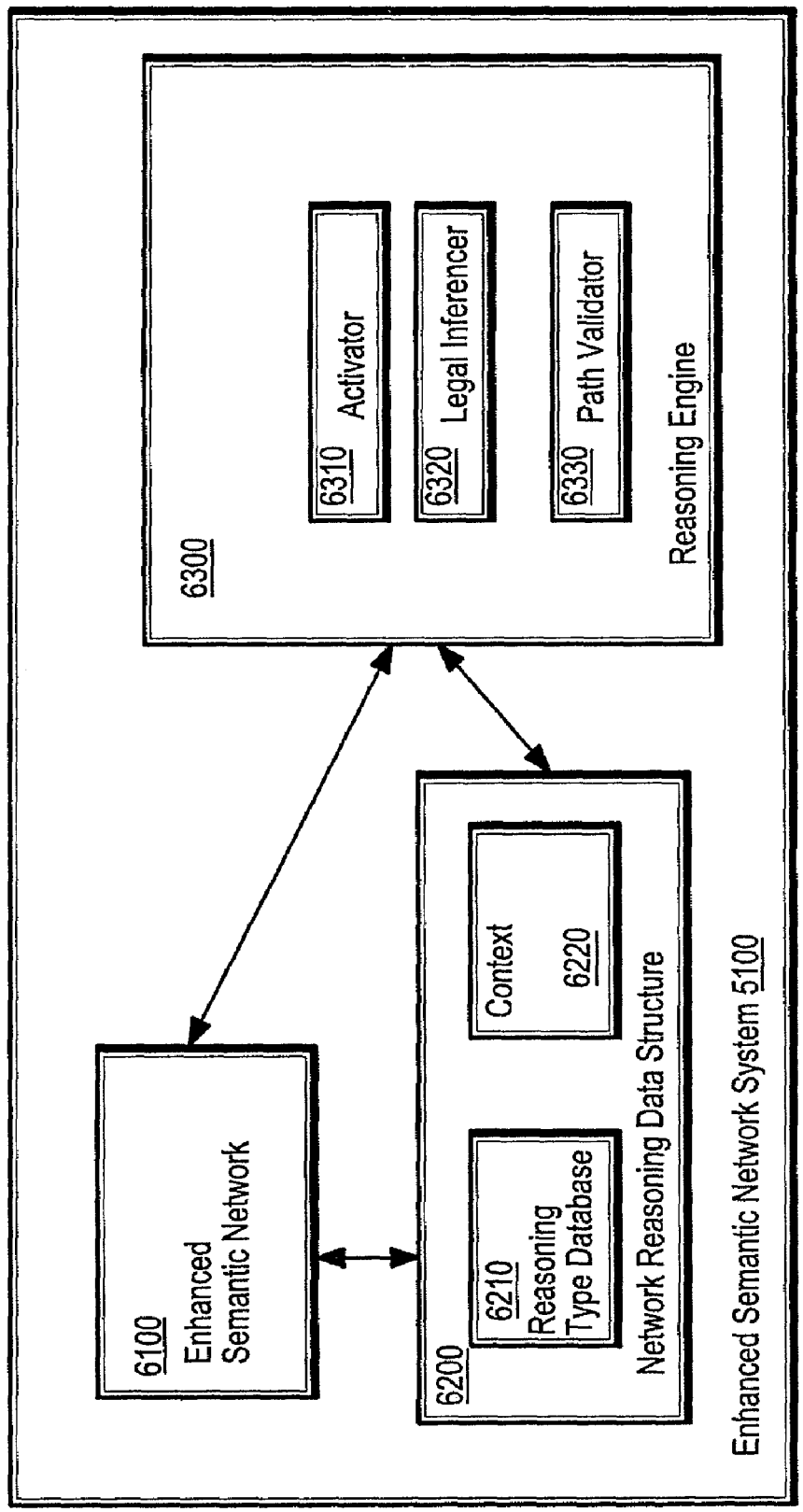
FIG. 6 depicts an overview of the enhanced semantic network system according to an embodiment of the present invention.

FIG. 6 presents an overview of the Enhanced Semantic Network System. The system comprises three components, the Semantic Network (6100), the Network Reasoning Data Structure (6200), and the Reasoning Engine (6300). The Semantic Network contains most of the information in the system, while the Reasoning Engine comprises the system components that perform the reasoning on the information in the semantic network. The Network Reasoning Data Structure contains auxiliary information that is used by the Reasoning Engine to perform the reasoning.

The Network Reasoning Data Structure comprises a Context (6220) and a Reasoning Type Database (6210). The Context contains situation-specific information; the Reasoning Type Database contains information about the general reasoning types that the system supports. As will be discussed in more detail in FIG. 14, these general reasoning types correspond to classes of paths. (For a discussion of paths, see FIG. 8.)

The Reasoning Engine comprises an Activator (6310), a Path Validator (6330), and a Legal Inferencer (6320). The Activator selects the points in the Semantic Network at which the reasoning processes begin. The Path Validator chooses the valid paths in the network—those paths that match the Context. The Legal Inferencer chooses from the valid paths in the network those paths that are legal—that is, those paths that match one or more of the reasoning types in the Reasoning Type Database. These components are described in greater length in the succeeding figure descriptions.

Figure 7:
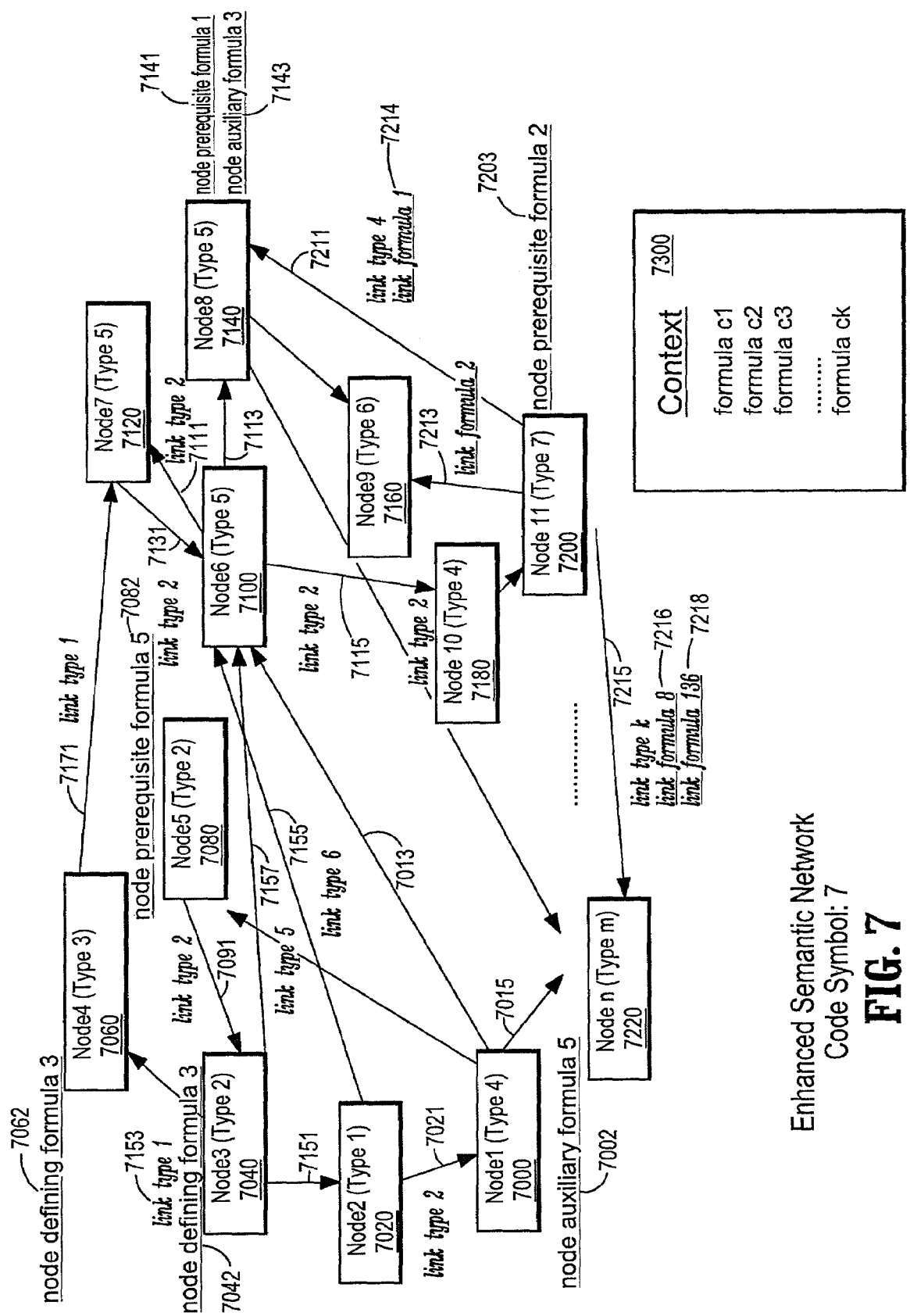
FIG. 7 illustrates a core part of the Enhanced Semantic Network System, a novel form of a semantic network, called an Enhanced Semantic Network, or alternatively, an Enhanced Semantic Network with Formulas on Links and Nodes ("ESNFLN"), according to an embodiment of the present invention.

FIG. 7 represents a novel form of a semantic network called an Enhanced Semantic Network (or alternately, an ESNFLN, an Enhanced Semantic Network with Formulas on Links and Nodes). In an Enhanced Semantic Network, there are a finite amount of node types and link types. Different link types may connect different node types. For example, a link of type 2 (7091) connects a node of type 2 (7080) and a node of type 3 (7040), but may also connect two nodes of type 5 (7111 connecting 7100 and 7120), or a node of type 5 (7100) with a node of type 4 (7180) (connected by 7131).

Rules may be associated with any node or link in the network. In this example network, rules are expressed as logical formulas (otherwise known as well-formed formulas or wffs). For example, node prerequisite formula 2 (7203) is associated with Node 11 (7200) and link formula 1 (7214) is associated with link 7211. Note that a single formula may be associated with different nodes or links. Thus, for example, node prerequisite formula 2 appears in the network as 7203 attached to 7200 and as 7082 attached to Node 5 (7080). Note also that in this example network there are three sorts of logical formulas which may be attached to nodes: prerequisite formulas (7203 attached to 7200, as explained above), auxiliary formulas, and defining formulas. For example, node auxiliary formula 5 (7082) is attached to node 5 (7080), and node defining formula 3 (7062) is attached to Node 4 (7060). There is at most one defining formula attached to any node. There are no such restrictions on prerequisite or auxiliary formulas. In practice, however, we may for convenience conjoin several prerequisite (or auxiliary) formulas into one logical formula, a conjunction in which each conjunct is one of the original formulas.

Intuitively, a definition wff at a node gives a formal characterization of the class of entities that the node represents. An auxiliary wff at a node means that the formula is true at the state that the node represents. Thus, an auxiliary wff at a node gives extra information about the state of affairs that the node represents. A prerequisite formula at a node, and a wff at a link are generally interpreted procedurally. A prerequisite formula at a node means that the wff must be true with respect to the Semantic Network Context for the node to be traversed in the creation of a valid path; similarly, a wff at a link means that the wff must be true with respect to the Context for that link to be traversed in the creation of a valid path. Depending on the structure of a particular portion of a semantic network, using wffs at nodes or links may be preferred. Valid paths are discussed in FIGS. 9 and 10. In this example Semantic Network, the Context (7300) comprises k formulas.

Figure 8:
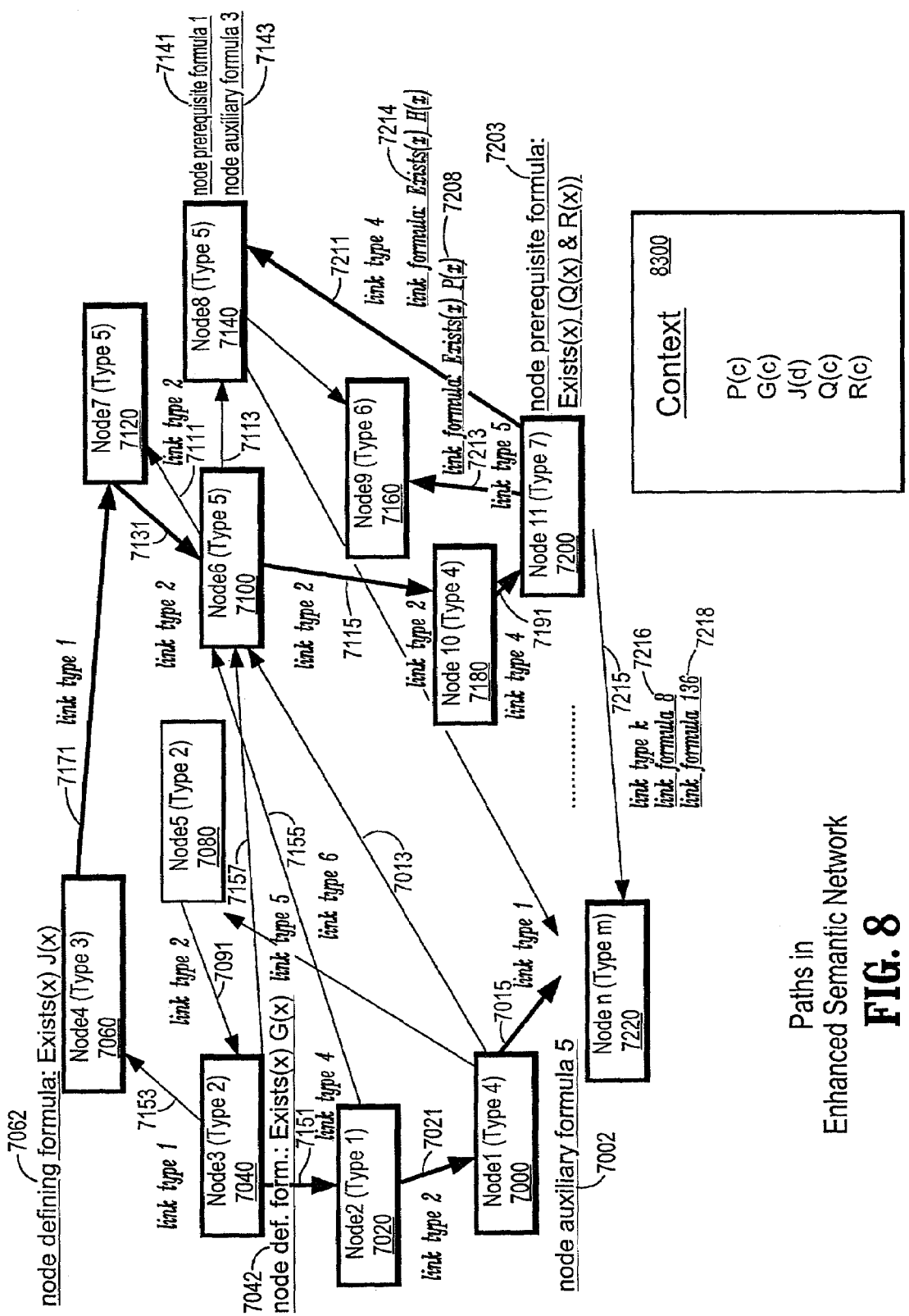
FIG. 8 illustrates paths in an Enhanced Semantic Network.

FIG. 8 depicts paths in the Enhanced Semantic Network. With the exception that actual examples of formulas are given at nodes, links, and in the context (8300), the semantic network in this figure is nearly identical to the semantic network in the previous figure.

A path is any sequence of alternating nodes and links, beginning with a node and ending with a node. Several example paths are outlined in boldface. For example, the sequence: Node 4 (7060)—link of type 1 (7171)—Node 7 (7120)—link of type2 (7131)—Node 6 (7100)—link of type 2 (7115)—node 10 (7180)—link of type 4 (7191)—Node 11 (7200)—link of type 5 (7208)—Node 9 (7160).

Other examples of paths are the sequences: Node 4 (7060)—link of type 1 (7171)—Node 7 (7120)—link of type2 (7131)—Node 6 (7100)—link of type 2 (7115)—node 10 (7180)—link of type 4 (7191)—Node 11(7200)—link of type 4 (7211)—Node 8 (7140) (note that this path overlaps the first example path except for the last link and the last node) and Node 3 (7040)—link of type 4 (7042)—Node 2 (7020)—link of type 2 (7021)—Node 1 (7000)—link of type 1 (7015)—Node n (7220). Only some paths are semantically meaningful, in the sense that they are valid and legal. The following figures illustrate this point.

Figure 9:
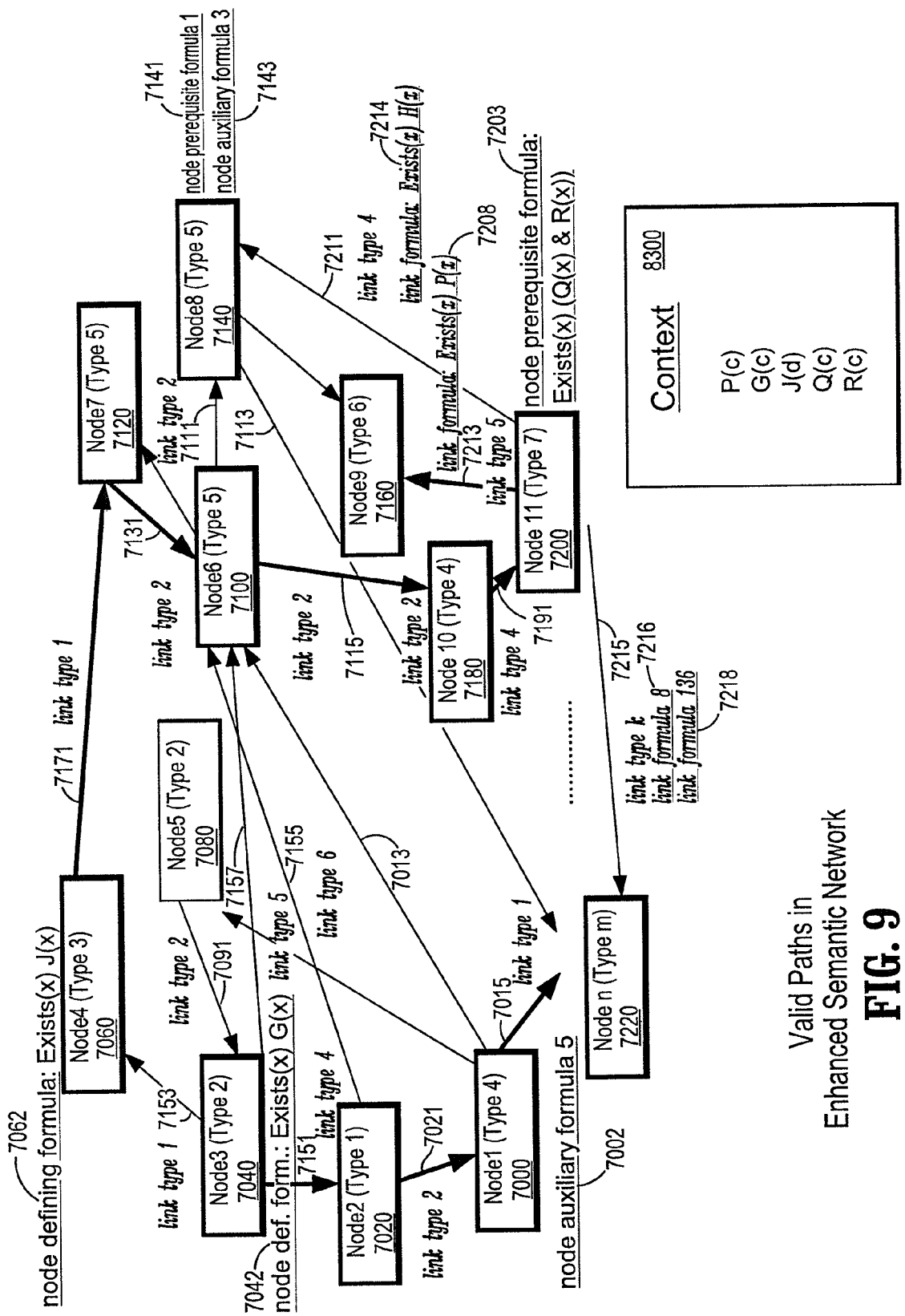
FIG. 9 depicts valid paths in an Enhanced Semantic Network.

FIG. 9 depicts valid paths in an Enhanced Semantic Network. A path is valid if a certain subset of rules attached to nodes or links—in this case defining formulas on starting nodes and prerequisite formulas on any other nodes and any formulas on links—are matched by rules in the context. Consider the three paths outlined in bold in the previous figure. Two of these three paths are valid. To see that this is so, consider each of the following paths:

Path 1: Node 3 (7040)—link of type 4 (7042)—Node 2 (7020)—link of type 2 (7021)—Node 1 (7000)—link of type 1 (7015)—Node n (7220).

There is one defining formula on the starting node in this path: Exists(x) G(x). This is matched by the formula in the context G(c), since that is an instantiation of Exists(x) G(x) (see Mates, 1979). Thus the path is valid.

Path 2: Node 4 (7060)—link of type 1 (7171)—Node 7 (7120)—link of type2 (7131)—Node 6 (7100)—link of type 2 (7115)—node 10 (7180)—link of type 4 (7191)—Node 11(7200)—link of type 5 (7208)—Node 9 (7160).

There is a definition formula on the starting node in this path: Exists(x) J(x). In addition, there is one link formula—Exists(x) P(x), and one node prerequisite formula—Exists(x) (Q(x) & R(x))—on this path. The definition formula Exists(x) J(x) is matched by the context formula J(d), since J(d) is an instantiation of Exists(x) J(x).

The link formula Exists(x) P(x) is matched by the formula in the context P(c), since P(c) is an instantiation of the formula Exists(x) P(x).

Likewise, the node prerequisite formula Exists(x)(Q(x) & R(x)) is matched by the context: the context contains the formulas Q(c) and R(c); these entail the conjunction Q(c) & R(c) which is an instantiation of the formula Exists(x)(Q(x) & R(x)). Thus, this path is valid.

3. Node 4 (7060)—link of type 1 (7171)—Node 7 (7120)—link of type2 (7131)—Node 6 (7100)—link of type 2 (7115)—node 10 (7180)—link of type 4 (7191)—Node 11 (7200)—link of type 4 (7211)—Node 8 (7140)

There is one link formula—Exists(x) H(x)—and one node prerequisite formula—Exists(x)(Q(x) & R(x))—on this path, in addition to the definition formula Exists(x) J(x) on the starting node.

As illustrated above, Exists(x)(Q(x) & R(x)) is matched by the context, as is Exists(x) J(x). However, the link formula Exists(x) H(x) is not matched by the context. Thus, this path is not valid.

FIG. 10 shows a sample table characterizing legal paths in an Enhanced Semantic Network. Intuitively, a legal path corresponds to a semantically meaningful valid path. Specifically, a legal path from Node A to Node B is one that corresponds to an inference from Node A to Node B. In other words, one should, under certain circumstances, be able to conclude that there is some relationship between the state of affairs that Node A represents and the state of affairs that Node B represents. This relationship can often be represented by a direct link between Nodes A and B. That is, one can substitute the legal valid path between A and B by the direct link.

The sample table gives characterizations of some legal paths and indicates which direct links could substitute for such legal paths. The characterizations are given as regular expressions (Hopcroft and Ullman, 1979). Regular expressions are simple expressions which are built up using the operators of concatenation and closure. They have a number of nice theoretical and practical properties. In particular, one can easily write efficient procedures to recognize regular expressions. The characterization of the legal paths is given in terms of the standard syntax for regular expressions. Consider, for example, the second entry in the left column (10120). This entry tells us that any path whose beginning segment is formed by concatenating a node of Type 3 with a link of type 1, and possibly repeating this configuration and then concatenating a node of Type 5, followed by any path segment, is a legal path. The second entry of the right column (10220) gives the single direct link, a link of type 2, that could substitute for this path. Note that in general a node or link can be described in terms of its type or in terms of the formulas attached to that link or node.

Figure 11:
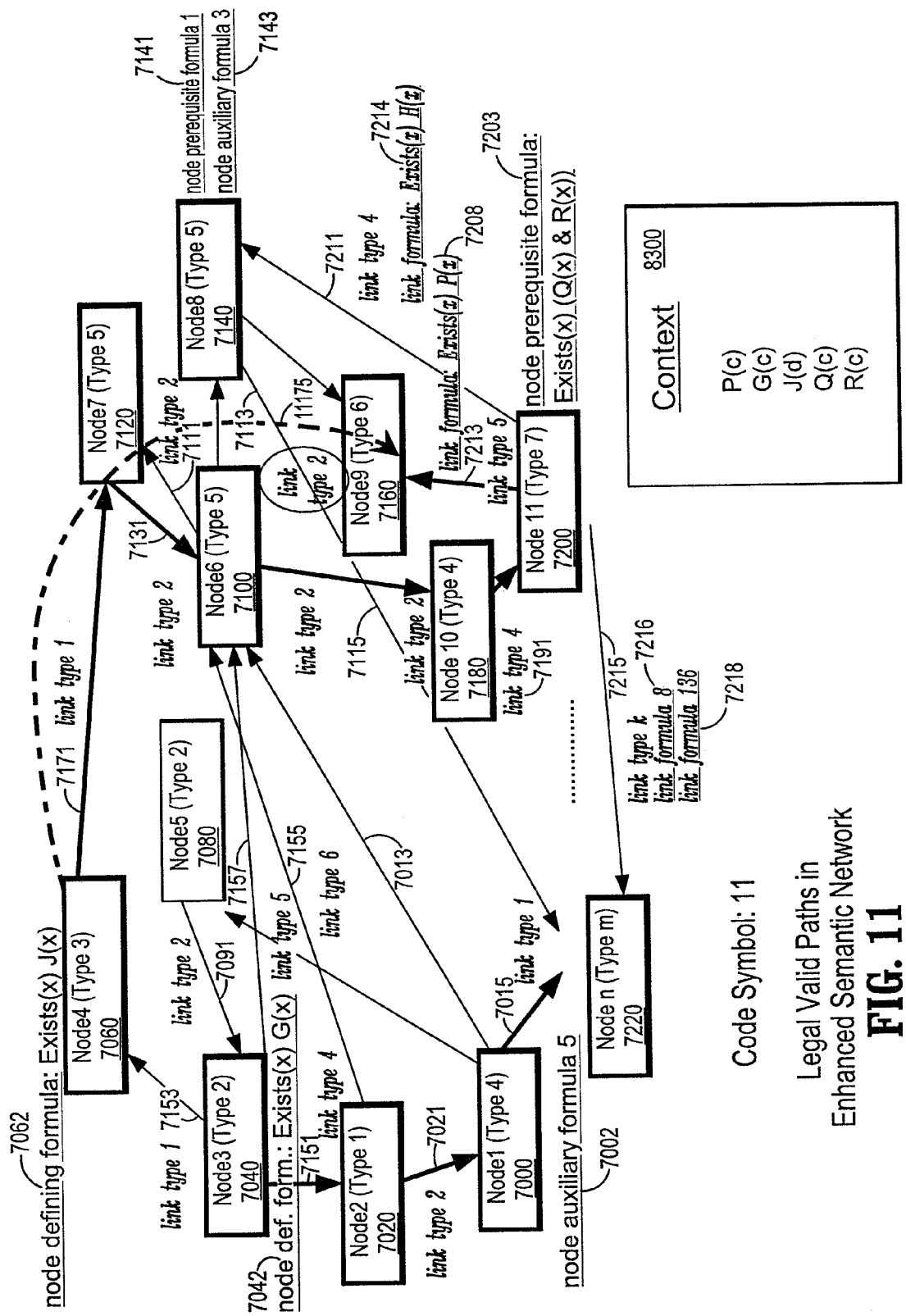
FIG. 11 shows an example legal valid path and a substituting direct link.

FIG. 11 shows such an example legal valid path and the substituting direct link. The path outlined in bold—Node 4 (7060)—link of type 1 (7171)—Node 7 (7120)—link of type2 (7131)—Node 6 (7100)—link of type 2 (7115)—node 10 (7180)—link of type 4 (7191)—Node 11(7200)—link of type 5 (7208)—Node 9 (7160)—is a legal path; indeed, it is in the class of regular expressions described in the second entry of the left column (10120) in the preceding figure. According to the preceding table, the substituting direct link is a link of type 2 (10220). Thus, we are permitted to draw a direct link of type 2 (11175) between Node 4 and Node 9.

It should be noted that the other valid path of FIG. 8—Node 3 (7040)—link of type 4 (7042)—Node 2 (7020)—link of type 2 (7021)—Node 1 (7000)—link of type 1 (7015)—Node n (7220)—is not a legal path according to the table of FIG. 10; it does not match any of the regular expressions on the left hand side of the table.

Figure 12:
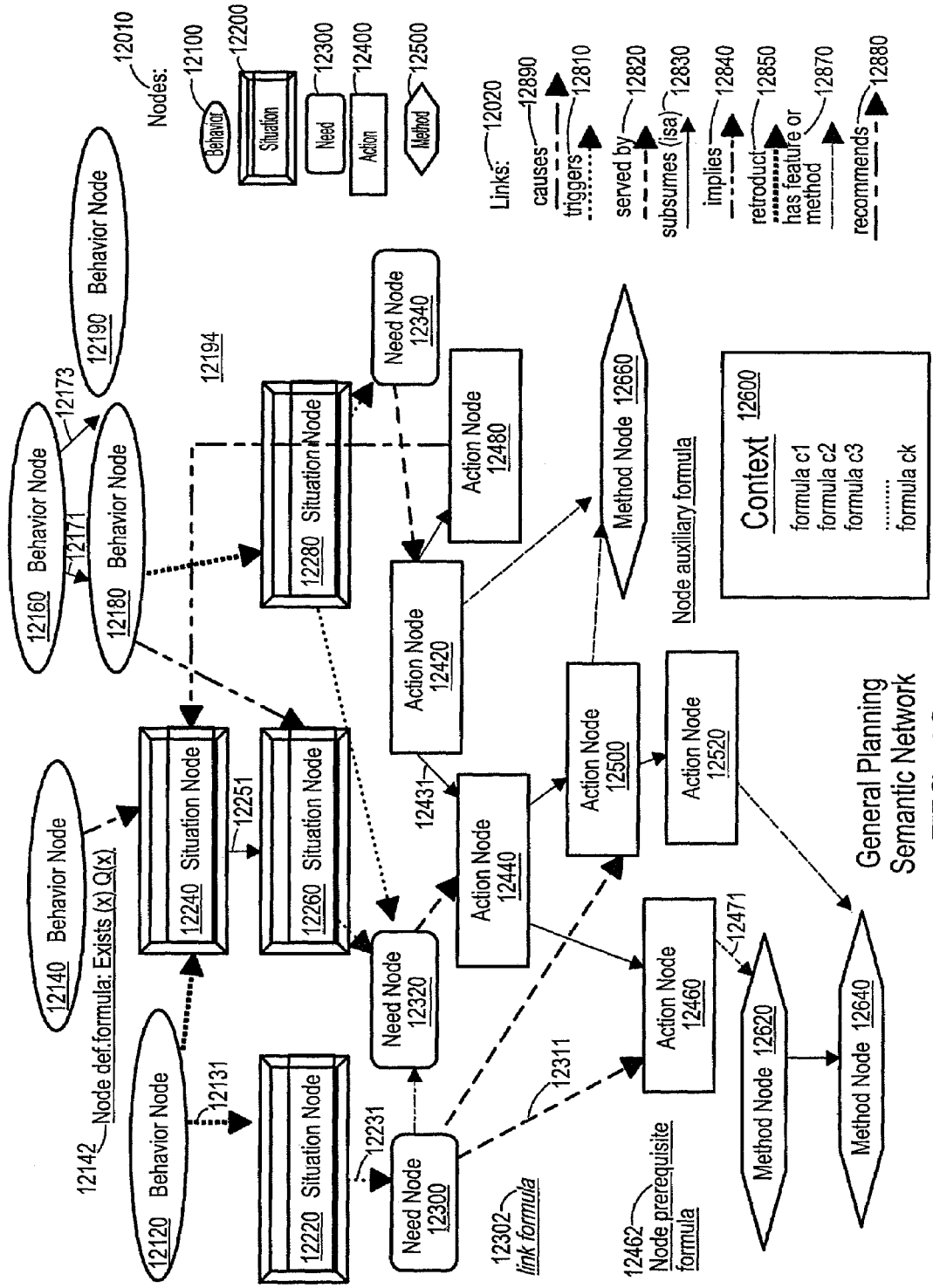
FIG. 12 shows a particular type of Enhanced Semantic Network, a Planning Semantic Network (PSN).

FIG. 12 shows a particular type of Enhanced Semantic Network, a Planning Semantic Network (PSN). The Planning Semantic Network represents various aspects of an agent's (whether human or electronic) actions and beliefs as he goes about his business. As the Nodes Table (12010) shows, there are 5 types of nodes in a PSN: Behavior nodes (12100), Situation nodes (12200), Need nodes (12300), Action nodes (12400), and Method (12500) nodes. The Links Table (12020) shows some of the links or relationships, including causes (12890), triggers (12810), served by (12820), and retroduct(12850), that may exist among these nodes. (Retroduction or alternatively abduction is a term, coined by Charles Sanders Peirce to describe a creative hypothesis that can explain behavior.) The graph shows examples of how these links relate the nodes in a PSN. Consider the retroduct link (12131) between a Behavior node (12120) and a Situation node (12220). From a particular behavior of a person, one may infer that he or she finds himself in some specific situation. In turn this situation can trigger a need; thus there is a triggers link (12231) between the Situation node (12220) and the Need Node (12300). A need can be served by a particular action. That is, this action may serve to satisfy the need that the agent has. Thus, for example, there is a served-by link (12311) between the Need node (12300) and the Action node (12460). An action may have many features or methods; see for example, the has-feature or method link (12471) between the Action node (12460) and the Method node (12620).

Behaviors, actions, and methods have certain similarities, but can generally be distinguished as follows: behavior refer to deeds that are observed; actions refer to deeds that are planned for; methods give specific means of accomplishing actions or details of the performance of such actions.

Note that there may be multiple links to and from nodes. For example, the Situation node (12280) has 2 triggers links connecting it, respectively, to Need nodes (12320) and (12340). Furthermore, Need Node (12320) connects to both Situation node (12260) and Situation node (12280).

Note also the same link type may connect different types of nodes. For example, the subsumes (is a) link connects different action nodes to one another (e.g., 12431 connects 12420 and 12440); it may also connect different situation nodes to one another (e.g., 12251 connects 12240 and 12260), and different types of behavior (e.g., 12171 connects 12160 and 12180; 12173 connects 12160 and 12190).

Figure 16:
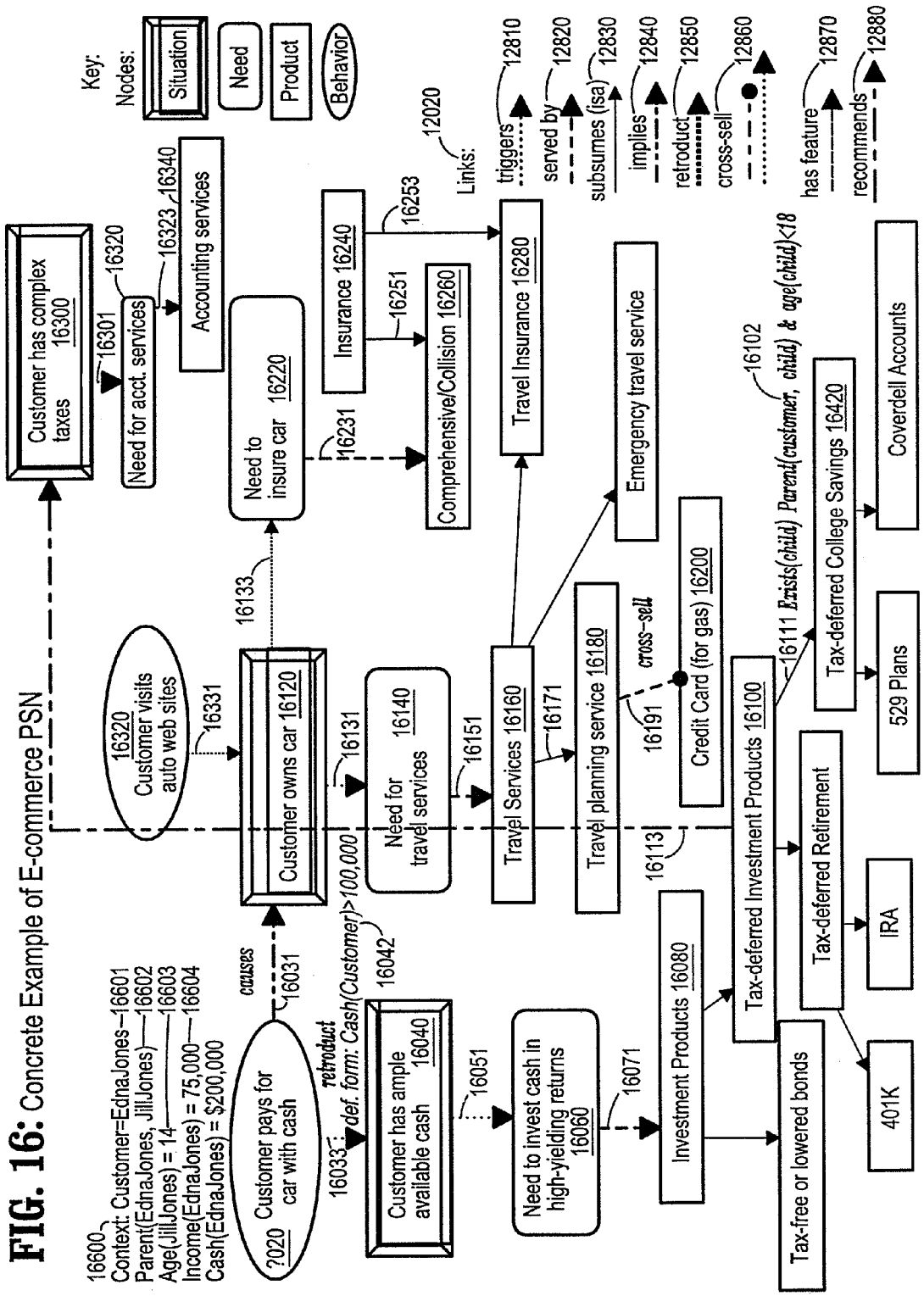
FIG. 16 depicts a specific example of a fragment of a Planning Semantic Network in the e-commerce domain, specifically an on-line banking/investment institution.

Note, moreover, that as with general Enhanced Semantic Networks, the PSN can have logical formulas attached to nodes and links. In this figure, a defining formula (12142), Exists(x) Q(x), is associated with a Behavior Node 12140. A specific example of a PSN in the e-commerce domain is shown in FIG. 16.

Finally, note that the Planning Semantic Network can be used to represent many domains. Examples include e-commerce, story understanding, and medical diagnosis and treatment. In the next figures, we explore a particular type of Planning Semantic Network, an E-commerce PSN.

Figure 13:
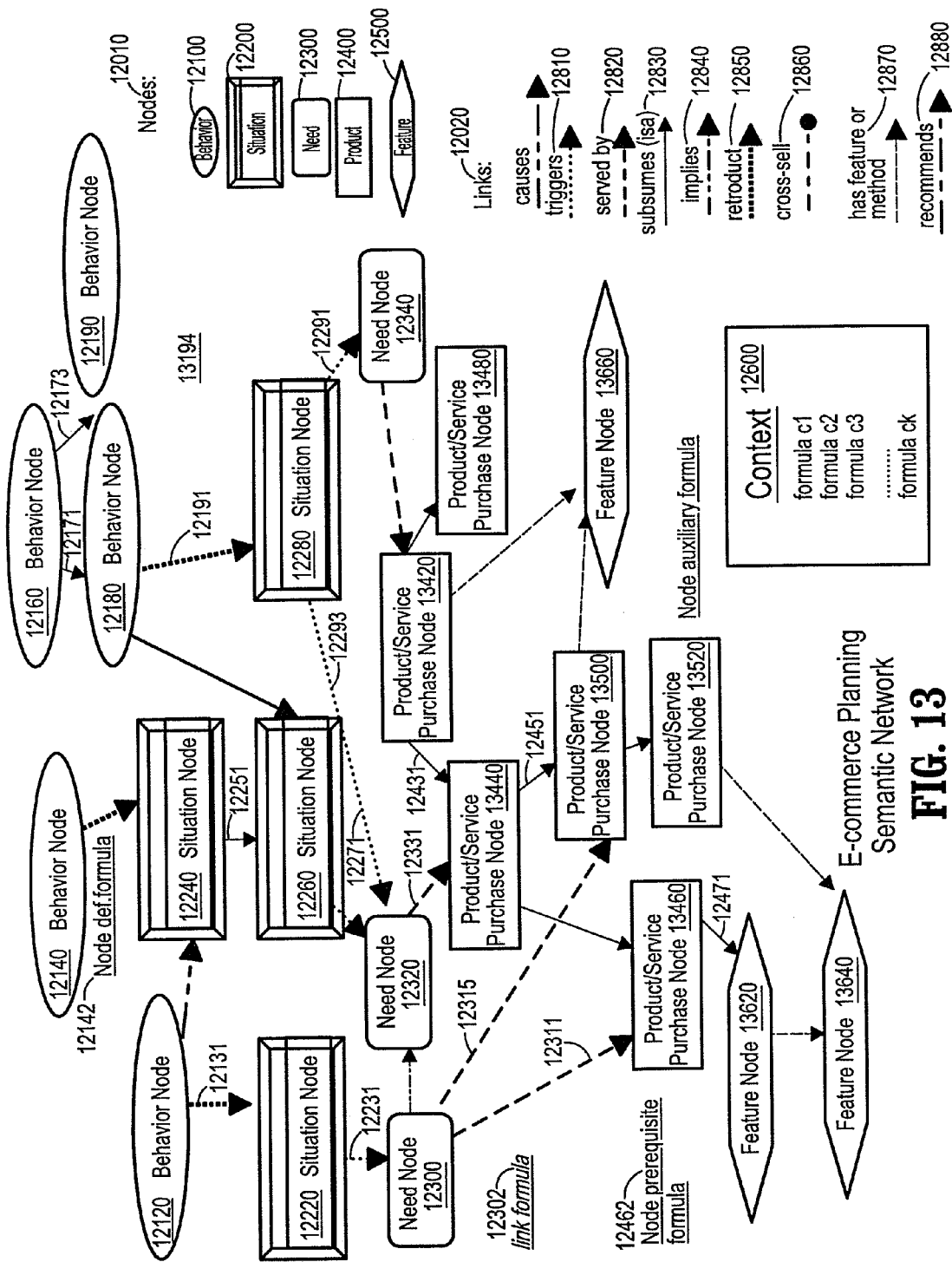
FIG. 13 shows a type of Planning Semantic Network known as an E-Commerce Planning Semantic Network (ECPSN).

FIG. 13 shows a type of Planning Semantic Network known as an E-Commerce Planning Semantic Network (ECPSN). The structure of an ECPSN is very similar to the structure of a PSN. As before, we have behavior, situation, and need nodes, and the various link types discussed above. However, in the figure, action nodes have been replaced by product/service nodes (see, e.g., nodes 13420 and 13480) and method nodes have been replaced by feature nodes (see e.g. nodes 13640 and 13660).

Product/service nodes are actually a particular type of action node; a product/service node represents a particular type of action, namely, that of purchasing that product or service. They are linked to need nodes by the served-by link if purchasing that product or service will serve a particular need Likewise, the feature nodes are actually a particular type of method node, since they give details about the product or service.

FIG. 14 is a table showing three examples of legal paths (14110, 14120, 14130), and the corresponding direct links that can substitute for these paths (14210, 14220, 14230). For example, the first entry shows one sort of legal path: Starting with a situation node, one finds a need that is triggered by the situation (by following the triggers link and possibly following implies links between needs), and then finds a product which serves the need (by following the served-by link and possibly following the subsumes link between products). This path can be substituted by a direct recommends link between a situation and a product. Given a particular situation, this product can be recommended.

The second example (14120, 14220) shows a class of legal paths that begin with a behavior node and is linked by the retroduct or causes link to the sort of path characterized in the first example.

Starting with a behavior node, one gets to a situation node, which, as in the paragraph above, leads to a product purchase node. This path can also be substituted by a direct recommends link—in this case between a behavior and a product purchase. Given a particular customer behavior, this product can be recommended.

The fourth example (14140, 14240) shows a class of legal paths that begin with a product purchase node and is linked by the causes link to a situation (and possibly other situations using the implies link). This path can be substituted by a direct hypothetical consequences link. That is, this situation shows the consequence of what would happen if one were to hypothetically make this product purchase.

The third example (14130, 14230) shows a class of legal paths that begin with a product purchase and end with another product purchase. Combining the first and third paths, this path finds the situations that result from a product purchase, the needs this situation triggers, and the product purchases that will serve these needs. The direct link in this case is the cross-sell link. This example highlights one of the powers of this framework: rather than explicitly posit a cross-sell link or discover it through mining large amounts of data, one can figure out a cross-sell link through reasoning about basic principles about agents and their situations, behaviors, and needs.

Figure 15:
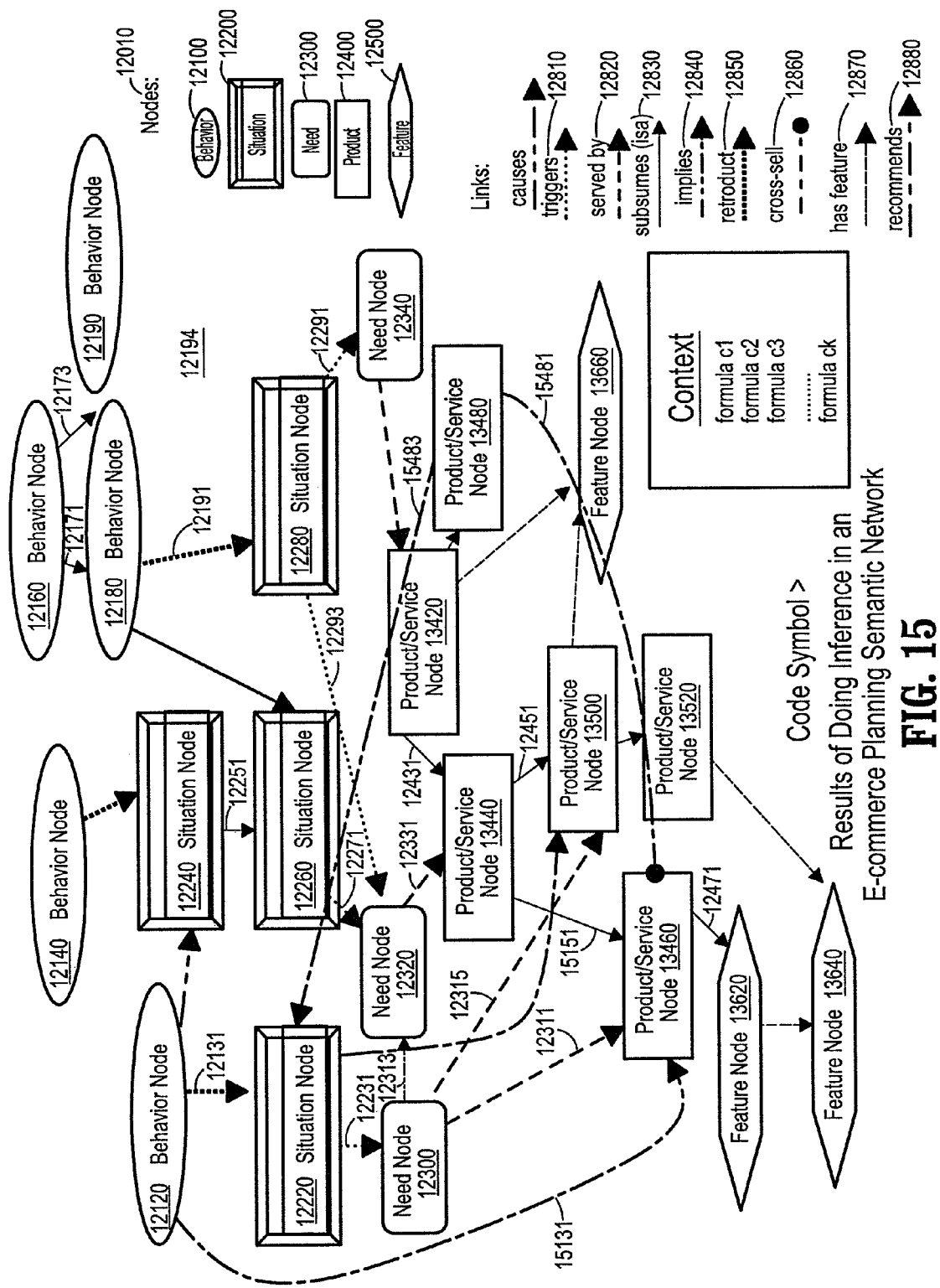
FIG. 15 shows several example legal paths and the substituting direct links.

FIG. 15 shows several such example legal paths and the substituting direct link. Note that in this example network, no rules are attached to nodes or links, and thus all paths are by default valid. For example, consider the path formed by: Behavior Node 12120—retroduct link 12131—Situation Node 12220—triggers link 12231—Need Node 12300—served-by link 12311—Product/Service Node 12460.

It is a legal path; in fact, it is in the class of regular expressions described in the first entry of the second row of the table in the preceding figure. According to this table, the substituting direct link is a recommends link. Thus, we are permitted to draw a direct recommends link (15131) between Behavior Node 12120 and Product/Service Node 12460.

As another example, consider the path formed by: Product/Service Node 13480—causes link 15483—Situation Node 12220—triggers link 12231—Need Node 12300—served-by link 12311—Product/Service Node 12460.

This is also a legal path. It is in the class of regular expressions described in the first entry of the third row of the table in the preceding figure. According to this table, the substituting direct link is a cross-sell link. Thus, we are permitted to draw a direct cross-sell link (15481) between Producte/Service Node 13480 and Product/Service Node 12460.

FIG. 16 depicts a specific example of a fragment of a Planning Semantic Network in the e-commerce domain, specifically an on-line banking/investment institution. As in FIG. 12, the network is composed of behavior, situation, need, and product/service nodes, linked by subsumes, triggers, retroduct, served-by, implies, cross-sell, and recommends links. The example shows how these constructs can be used to formally represent and reason about practical banking situations. For example, one node in the network is the Situation Node Customer has ample available cash(16040). It is linked by the triggers link (16051) to the Need Node Need to invest cash in high-yielding return (16060). In turn, that is linked by the served-by link to the Product/Service Node Investment Products (16080), which is the root of a hierarchy of investment products. In fact, this sequence of nodes and links is a legal path (according to the table in FIG. 14), and as the next figure demonstrates, can be substituted by a recommends link. That is, this network can be used to recommend that if a customer has large amounts of available cash, he might be a candidate for certain investment products.

Two behavior nodes are shown in this network fragment. In the first case, the behavior is that of a customer buying a car with cash. One can hypothesize (retroduct) that the customer has ample available cash, the situation discussed above. Although this sort of reasoning does not always work (there may be exceptions; e.g., the customer may have used all of his available cash on his car), it is widespread enough that it is reasonable enough to formalize it in a banking model. One can also reason that the customer owns, or will soon own a car, because buying a car causes one to own that car.

In the second case, the behavior is that of a customer visiting auto web sites (16320). As in the preceding case, one can reason that the customer owns a car or will soon own a car (causes link 16331 to Situation Node 16120).

In this network fragment, the context supplies facts about a specific customer, Edna Jones. Logical formulas state that Edna Jones has an annual income of $75,000, and has a daughter Jill who is 14 years old. These facts will be used to determine which paths are valid. We discuss this in greater detail in the next figure.

There are several points to note about this network fragment. First, note that a cross-sell link can be explicitly put into the network. (See the link 16191 between nodes 16180 and 16200.) As described in FIG. 15, the cross-sell link can also be added to the network as a result of an inference. Thus, cross-sell links can arise in the network in two ways. Second, note that a customer's situation may yield multiple paths to the same product. This is described in greater detail in the next figure.

Figure 17:
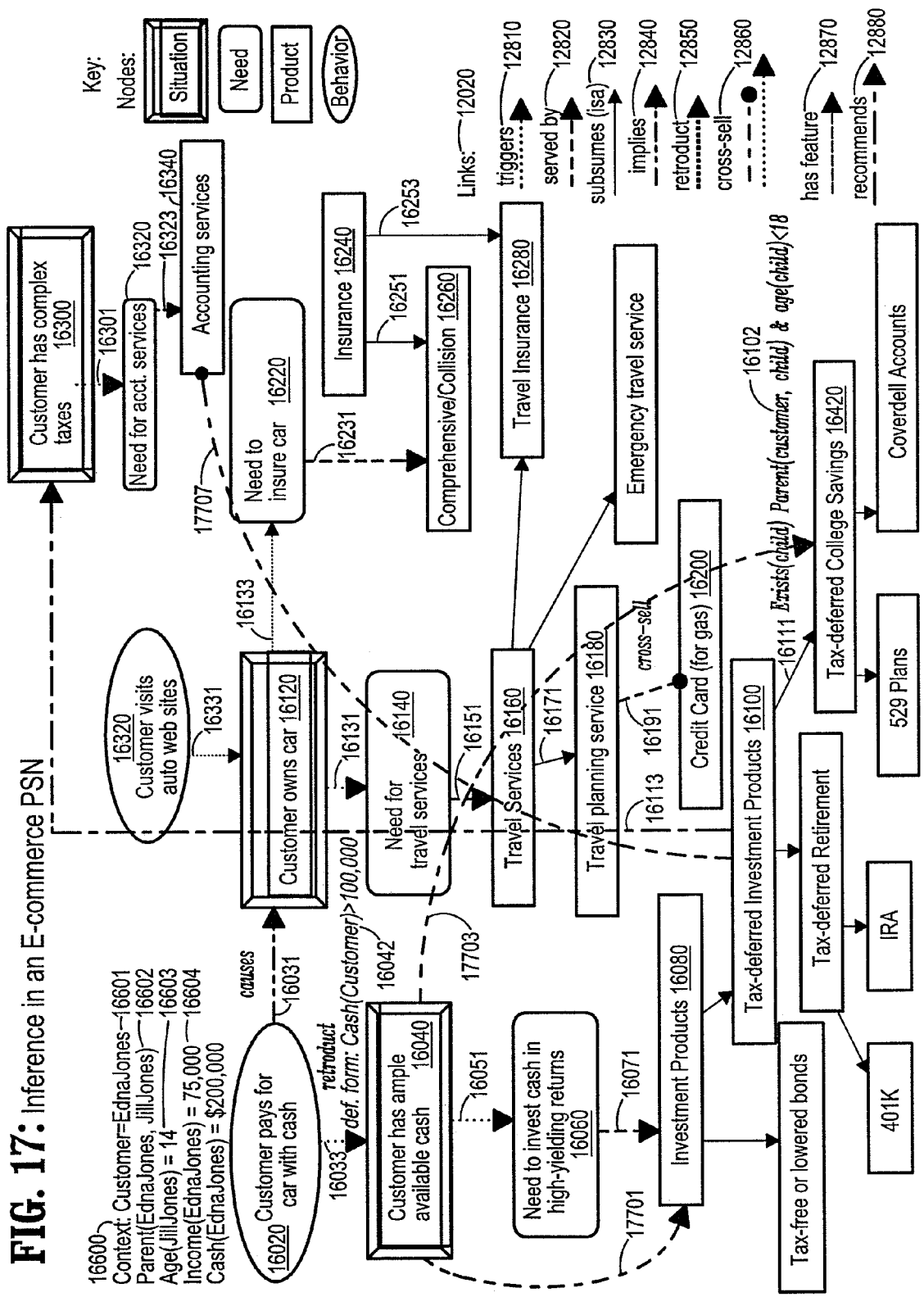
FIG. 17 depicts inference in the example E-Commerce PSN shown in FIG. 16.

FIG. 17 depicts inference in the example E-Commerce PSN shown in FIG. 16. The legal and valid paths need to be determined.

Consider the path comprising the nodes: SituationNode: Customer has ample available cash (16040)—triggers link (16051)—Need Node: Need to invest in high-yielding returns (16060)—served-by link (16071)—Product/Service Node: Investment Products (16080).

According to the first row of the table in FIG. 14 (14110, 14210), this is a legal path. It can be substituted by a recommends link between the first and last nodes. Thus, a recommends link 17701 between nodes 16040 and 16080 can be added.

Likewise, consider the path comprising the nodes: Product/Service Node: Tax-deferred investment products (16100)—causes link (16113)—Situation Node: Customer has complex taxes (16300)—triggers link (16301)—. Need node: Need for accounting services (16320)—served-by link(16323)—Product/Service Node(16340).

According to the third row of the table in FIG. 14 (14130, 14140), this path can be substituted by a cross-sell link between the first and last nodes. Thus, a cross-sell link (17707) between nodes 16100 and 16340 can be added.

A variety of other direct links substituting for legal paths can be drawn in this figure.

Figure 18:
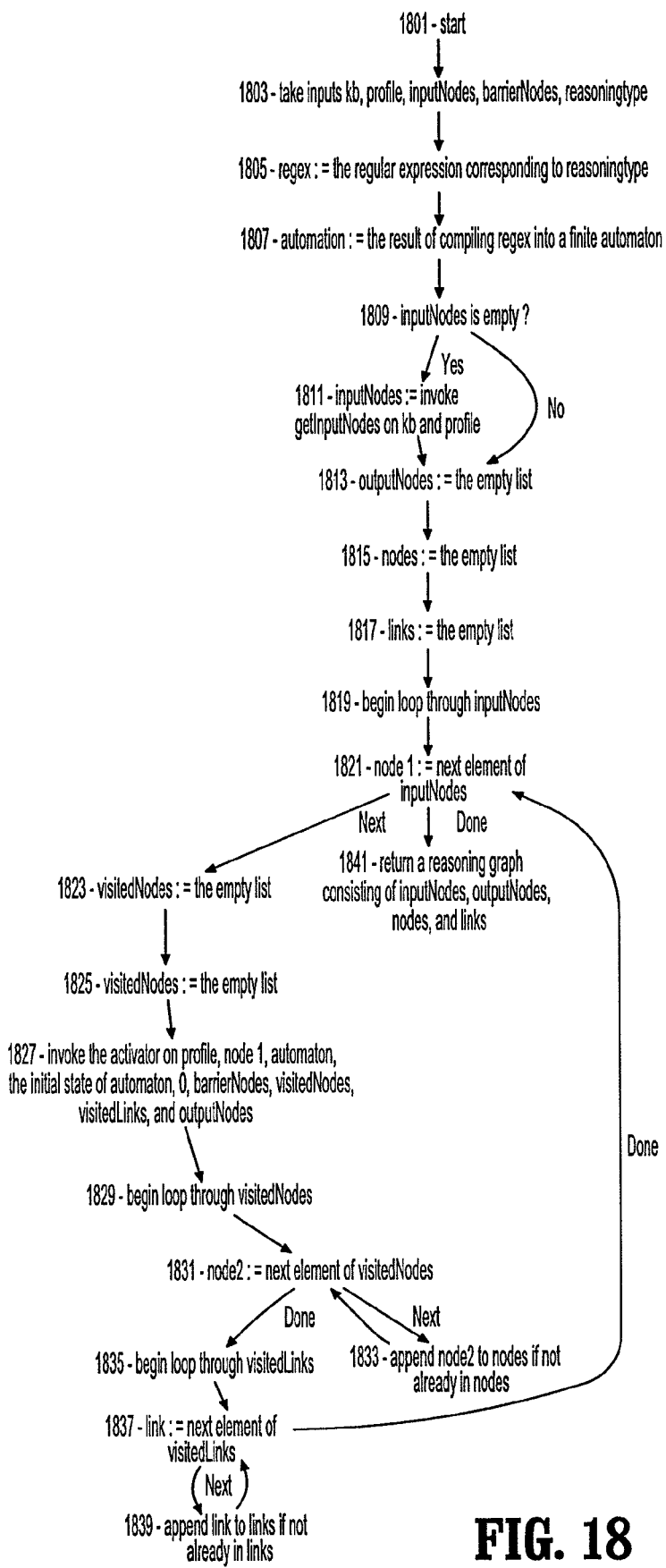
FIG. 18 is a flowchart of a reasoning engine according to an embodiment of the present invention.

FIG. 18 is a flowchart of the reasoning engine. The flowchart starts with step 1801. In step 1803, kb, profile, inputNodes, barrierNodes, and reasoningtype are taken as input arguments. kb is the knowledge base. profile is the customer profile and/or context. inputNodes is a list of nodes from which reasoning starts. If an empty inputNodes list is passed in, the reasoning engine automatically determines the nodes from which reasoning starts by consulting the profile. barrierNodes is a list of nodes beyond which reasoning cannot proceed (inclusive). reasoningtype is the type of reasoning that is to be performed.

In step 1805, regex is set to the regular expression corresponding to reasoningtype. The regular expression corresponding to reasoningtype is obtained from the regular expression to reasoning type mapping table. In step 1807, automaton is set to the result of compiling regex into a finite automaton. A regular expression is compiled into a finite automaton according to Chapter 2 of John E. Hopcroft and Jeffrey D. Ullman (1979) *Introduction to Automata Theory, Languages, and Computation, Reading*, Mass.: Addison-Wesley. In step 1809, it is tested whether inputNodes is empty. If so, a branch is taken to step 1811. If not, a branch is taken to step 1813. In step 1811, inputNodes is assigned to the result of invoking getInputNodes on kb and profile. In step 1813, outputNodes is set to the empty list. In step 1815, nodes is set to the empty list. In step 1817, links is set to the empty list. Step 1819 begins a loop through inputNodes. In step 1821, it is tested whether there are more inputNodes. If so, node1 is set to the next element of inputNodes and a branch is taken to step 1823. If not, a branch is taken to step 1841. In step 1823, visitedNodes is set to the empty list. In step 1825, visitedLinks is set to the empty list. In step 1827, the activator is invoked on profile, node1, automaton, the initial state of automaton, 0, barrierNodes, visitedNodes, visitedLinks, and outputNodes. Step 1829 begins a loop through visitedNodes. In step 1831, it is tested whether there are more visitedNodes. If so, node2 is set to the next element of visitedNodes and a branch is taken to step 1833. If not, a branch is taken to step 1835. In step 1833, node2 is added to the list of nodes if not already in the list. After step 1833, a branch is taken to step 1831.

Step 1835 begins a loop through visitedLinks. In step 1837, it is tested whether there are more visitedLinks. If so, link is set to the next element of visitedLinks and a branch is taken to step 1839. If not, a branch is taken to step 1821. In step 1839, link is added to the list of links if not already in the list. After step 1839, a branch is taken to step 1837. In step 1841, the flowchart returns a reasoning graph comprising inputNodes, outputNodes, nodes, and links.

Figure 19:
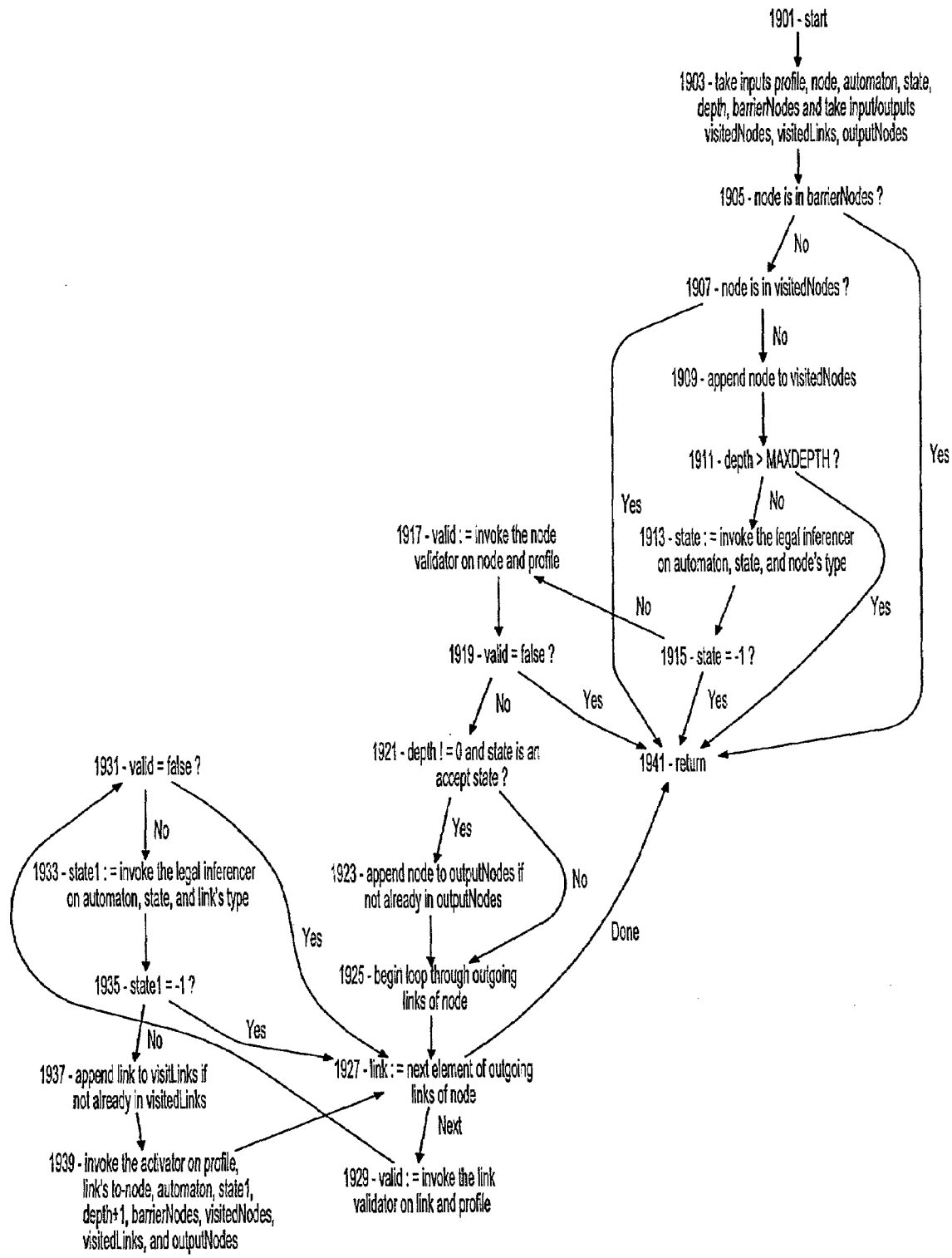
FIG. 19 is a flowchart of an activator according to an embodiment of the present invention.

FIG. 19 is a flowchart of the activator. The flowchart starts with step 1901. In step 1903, profile, node, automaton, state, depth, and barrierNodes are taken as input arguments and visitedNodes, visitedLinks, and outputNodes are taken as input/output arguments. profile is the customer profile and/or context. node is the node from which reasoning starts. automaton is a finite automaton. state is the current state of the finite automaton. depth is the current depth of the reasoning. barrierNodes is a list of nodes beyond which reasoning cannot proceed (inclusive). visitedNodes is a list of visited nodes.

visitedLinks is a list of visited links. outputNodes is a list of output nodes of the reasoning, such as recommendations. In step 1905, it is tested whether node is in barrierNodes. If so, a branch is taken to step 1941. If not, a branch is taken to step 1907. In step 1907, it is tested whether node is in visitedNodes. If so, a branch is taken to step 1941. If not, a branch is taken to step 1909. In step 1909, node is added to visitedNodes. In step 1911, it is tested whether depth >MAXDEPTH. If so, a branch is taken to step 1941. If not, a branch is taken to step 1913. In step 1913, state is assigned to the result of invoking the legal inferencer on automaton, state, and node's type. In step 1915, it is tested whether state=−1. If so, a branch is taken to step 1941. If not, a branch is taken to step 1917. In step 1917, valid is assigned to the result of invoking the node validator on node and profile. In step 1919, it is tested whether valid=false. If so, a branch is taken to step 1941. If not, a branch is taken to step 1921. In step 1921, it is tested whether depth !=0 and state is an accept state. If so, a branch is taken to step 1923. If not, a branch is taken to step 1925. In step 1923, node is added to the list of outputNodes if not already in the list.

Step 1925 begins a loop through outgoing links of node. In step 1927, it is tested whether there are more outgoing links of node. If so, link is set to the next element of outgoing links of node and a branch is taken to step 1929. If not, a branch is taken to step 1941. In step 1929, valid is assigned to the result of invoking the link validator on link and profile. In step 1931, it is tested whether valid=false. If so, a branch is taken to step 1927. If not, a branch is taken to step 1933. In step 1933, state1 is assigned to the result of invoking the legal inferencer on automaton, state, and link's type. In step 1935, it is tested whether state1=−1. If so, a branch is taken to step 1927. If not, a branch is taken to step 1937. In step 1937, link is added to the list of visitedLinks if not already in the list. In step 1939, the activator is invoked on profile, link's to-node, automaton, state1, depth+1, barrierNodes, visitedNodes, visitedLinks, and outputNodes. After step 1939, a branch is taken to step 1927. In step 1941, the flowchart terminates.

Figure 20:
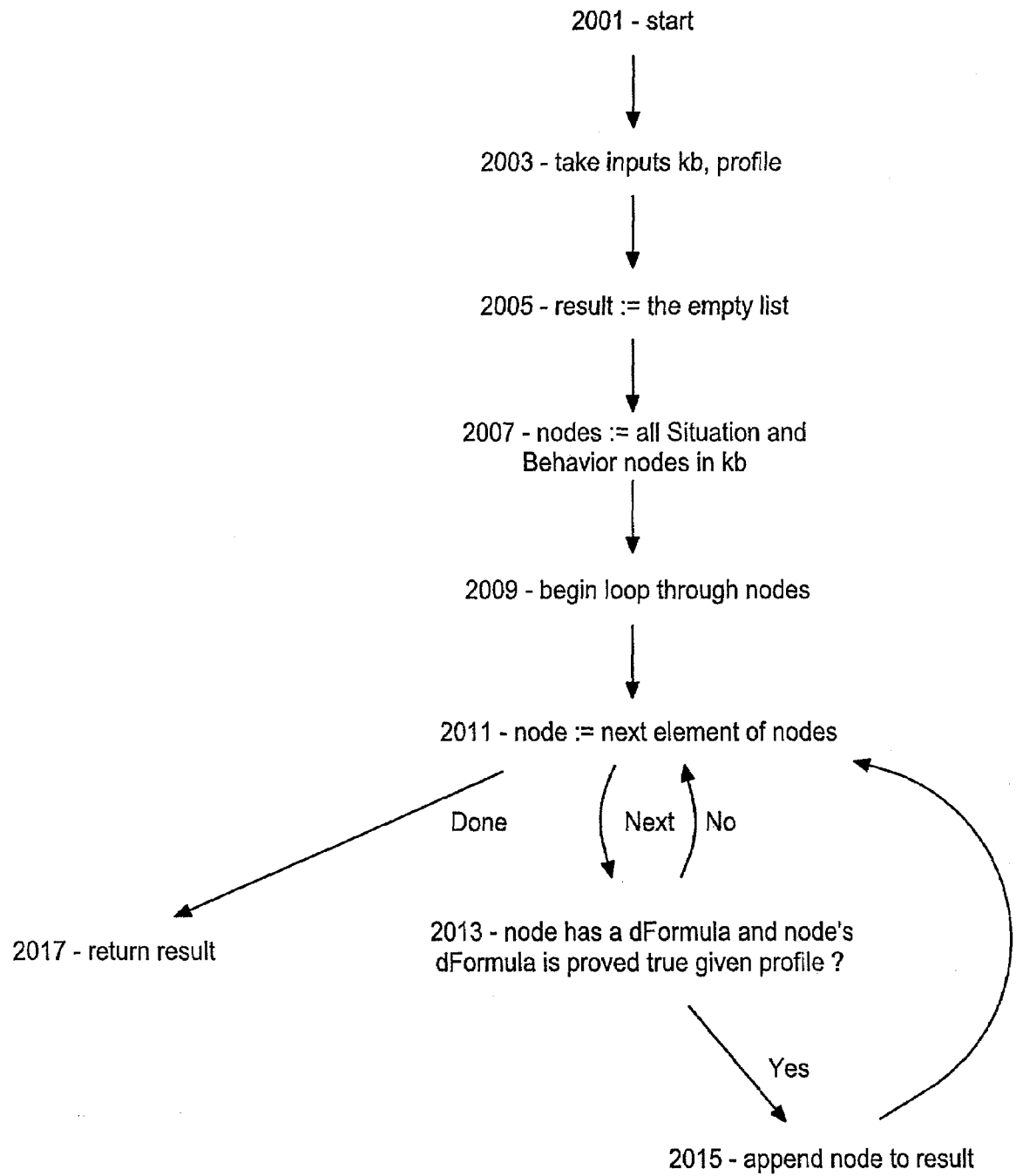
FIG. 20 is a flowchart of getInputNodes according to an embodiment of the present invention.

FIG. 20 is a flowchart of getInputNodes. The flowchart starts with step 2001. In step 2003, kb and profile are taken as input arguments. kb is the knowledge base. profile is the customer profile and/or context. In step 2005, result is set to the empty list. In step 2007, nodes is set to all Situation and Behavior nodes in kb. Step 2009 begins a loop through nodes. In step 2011, it is tested whether there are more nodes. If so, node is set to the next element of nodes and a branch is taken to step 2013. If not, a branch is taken to step 2017. In step 2013, it is tested whether node has a dFormula and node's dFormula is proved true given profile. A dFormula is a definition formula. If so, a branch is taken to step 2015. If not, a branch is taken to step 2011. In step 2015, node is added to result. After step 2015, a branch is taken to step 2011. In step 2017, the flowchart returns result.

Figure 21:
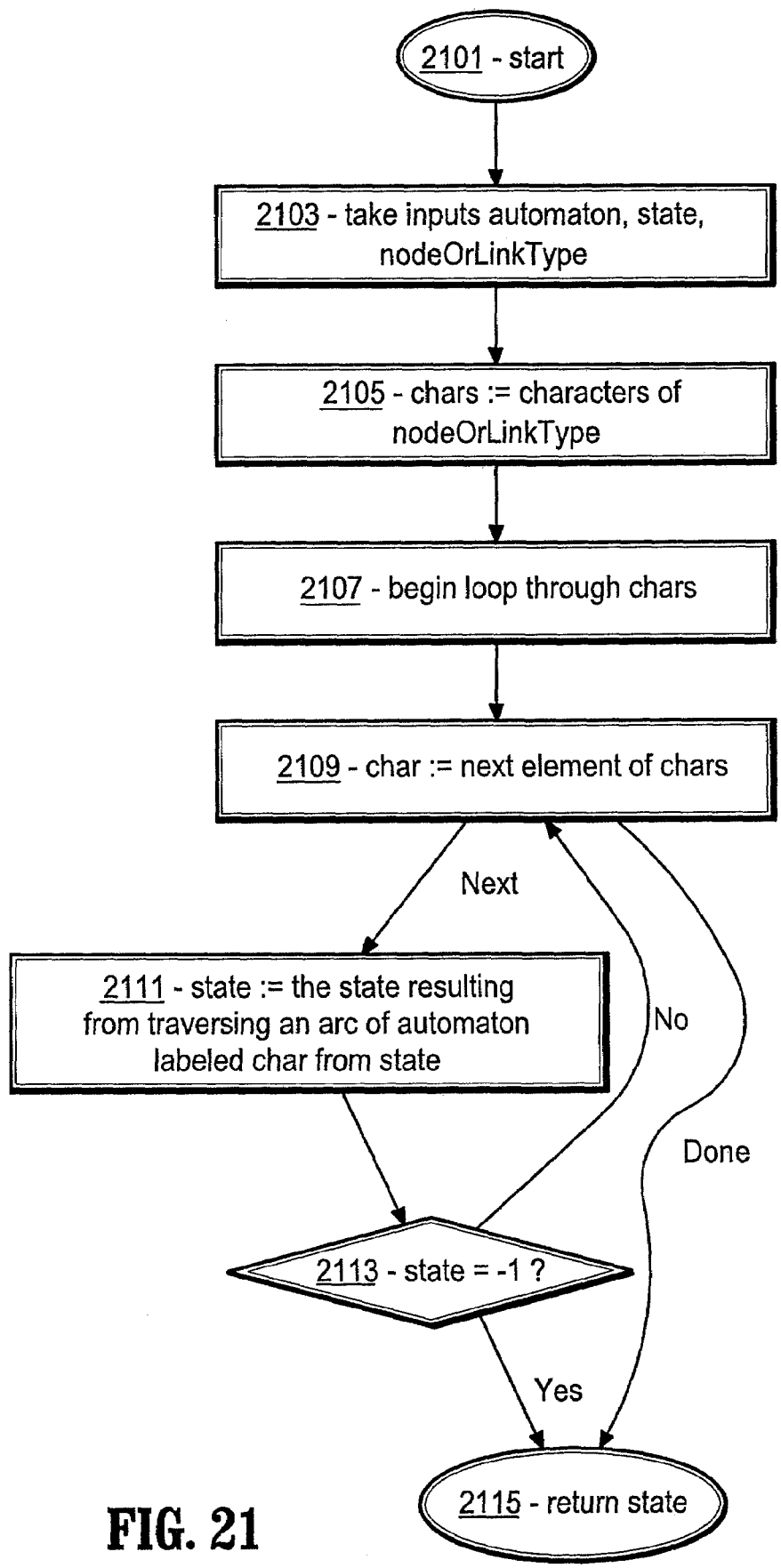
FIG. 21 is a flowchart of a legal inferencer according to an embodiment of the present invention.

FIG. 21 is a flowchart of the legal inferencer. The flowchart starts with step 2101. In step 2103, automaton, state, and nodeOrLinkType are taken as input arguments. automaton is a finite automaton. state is the state of the finite automaton. nodeOrLinkType is a character string representation of a node type or link type. In step 2105, chars is set to characters of nodeOrLinkType.

Step 2107 begins a loop through chars. In step 2109, it is tested whether there are more chars. If so, char is set to the next element of chars and a branch is taken to step 2111. If not, a branch is taken to step 2115. In step 2111, state is set to the state resulting from traversing an arc of automaton labeled char from state. If there is no arc of automaton from state labeled with char, the state is set to −1. In step 2113, it is tested whether state=−1. If so, a branch is taken to step 2115. If not, a branch is taken to step 2109. In step 2115, the flowchart returns state.

Figure 22:
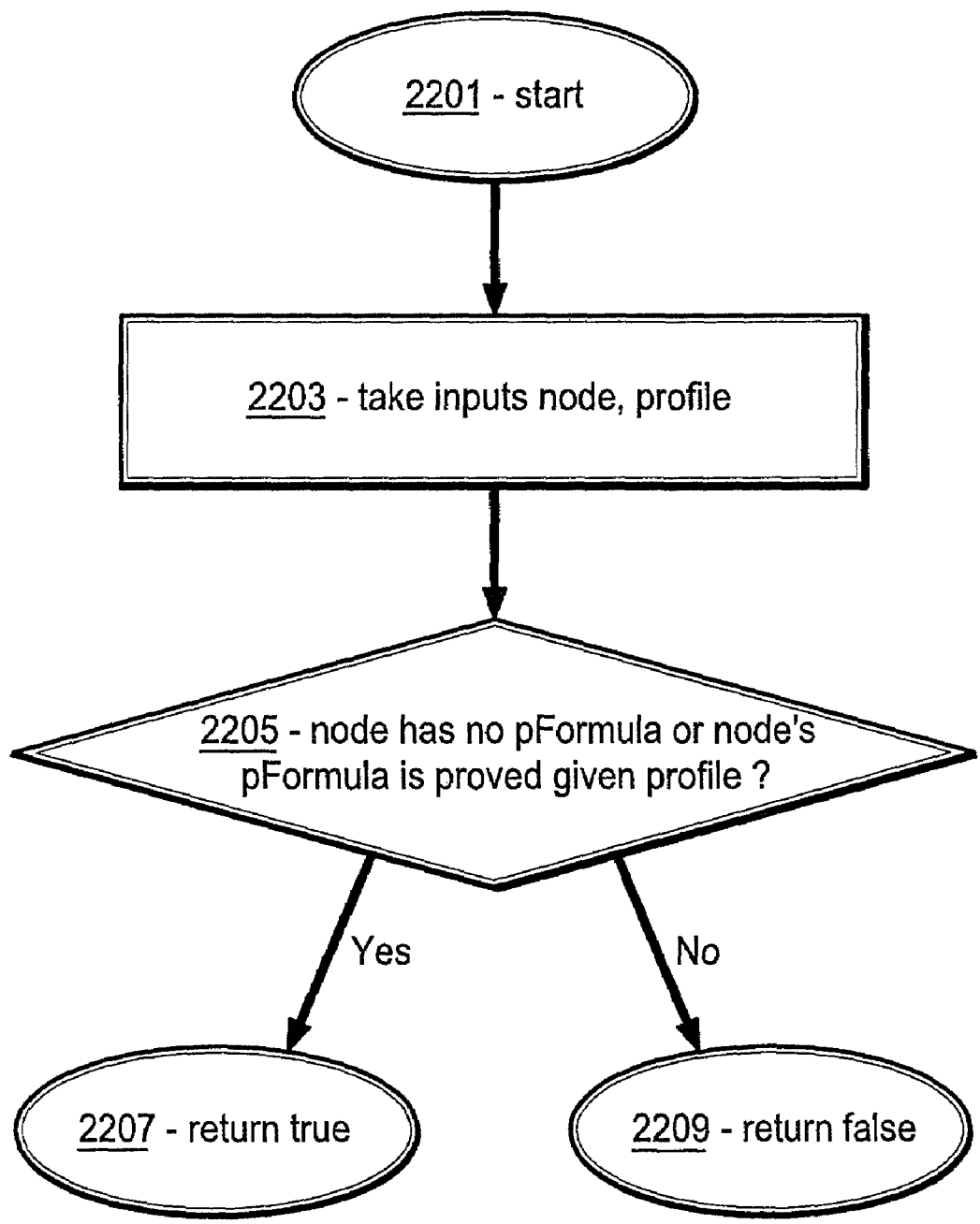
FIG. 22 is a flowchart of a node validator according to an embodiment of the present invention.

FIG. 22 is a flowchart of the node validator. The flowchart starts with step 2201. In step 2203, node and profile are taken as input arguments. node is the node to be validated. profile is the customer profile and/or context. In step 2205, it is tested whether node has no pFormula or node's pFormula is proved given profile. A formula is proved using a Prolog theorem prover (W. F. Clocksin and C. S. Mellish [1987] *Programming in Prolog*, Springer Verlag). A pFormula is a precondition formula. If so, a branch is taken to step 2207. If not, a branch is taken to step 2209. In step 2207, the flowchart returns true. In step 2209, the flowchart returns false.

Figure 23:
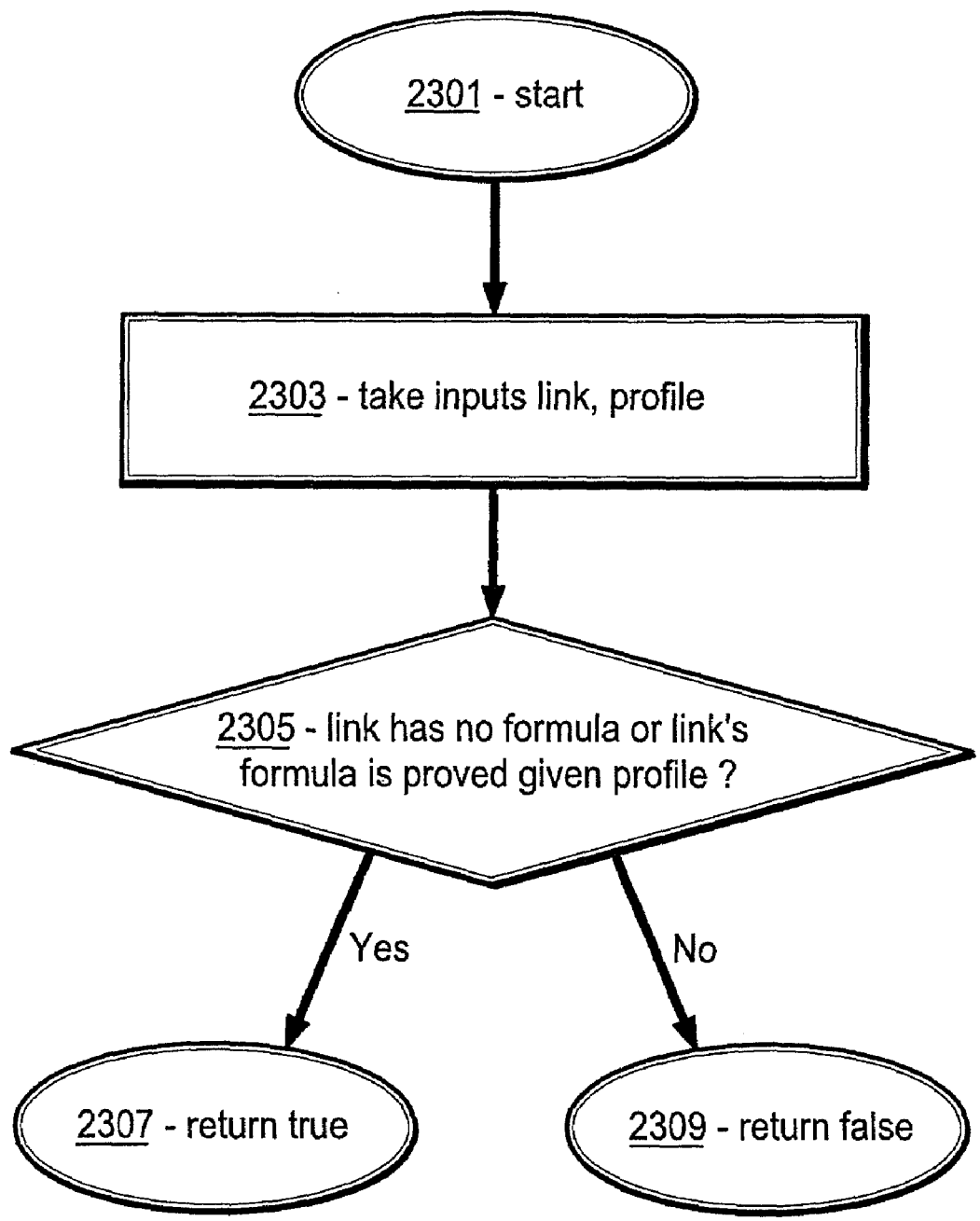
FIG. 23 is a flowchart of a link validator according to an embodiment of the present invention.

FIG. 23 is a flowchart of the link validator. The flowchart starts with step 2301. In step 2303, link and profile are taken as input arguments. In step 2305, it is tested whether link has no formula or link's formula is proved given profile. A formula is proved using a Prolog theorem prover (W. F. Clocksin and C. S. Mellish [1987]*Programming in Prolog*, Springer Verlag). If so, a branch is taken to step 2307. If not, a branch is taken to step 2309. In step 2307, the flowchart returns true. In step 2309, the flowchart returns false.

Figure 24:
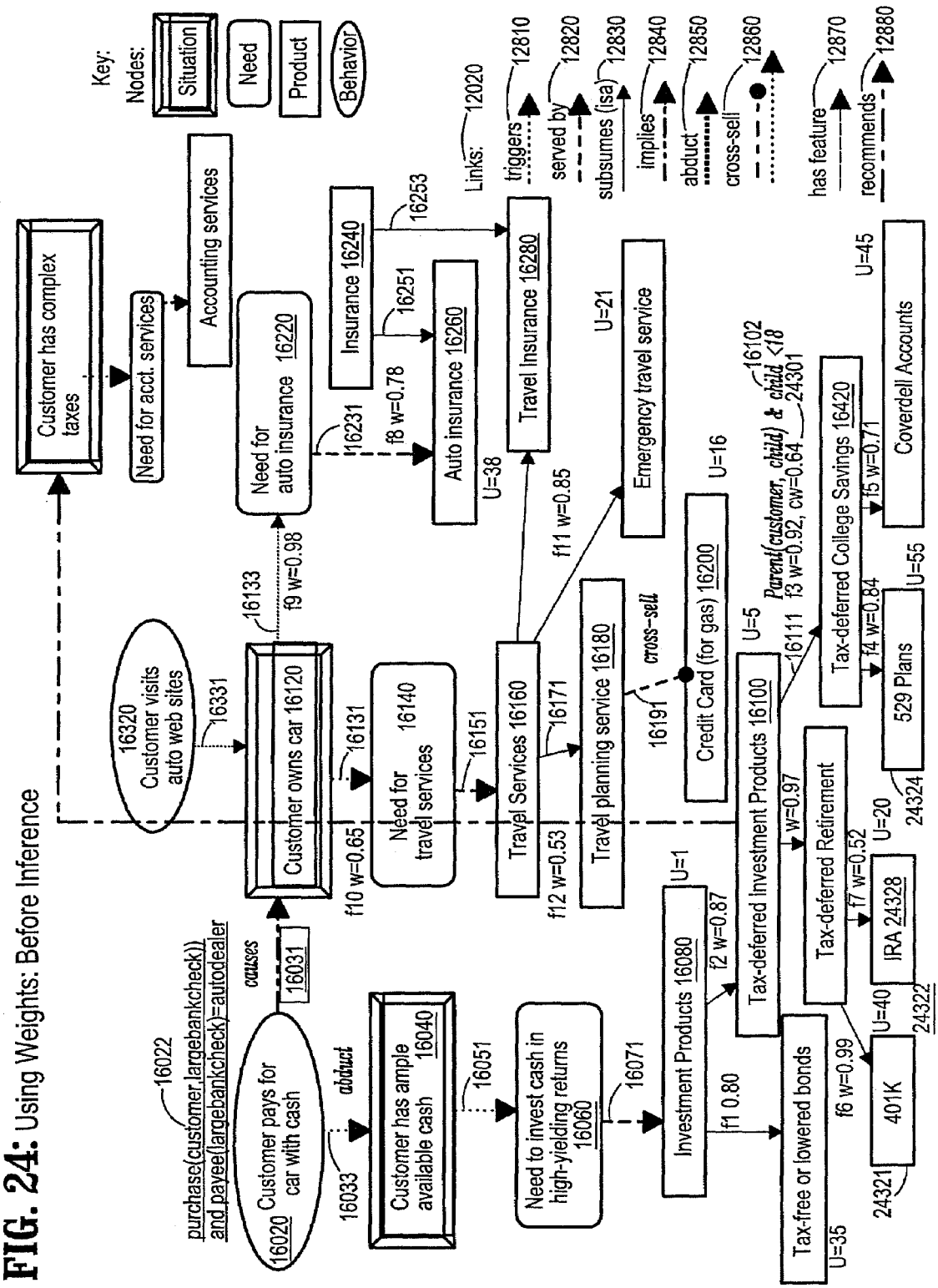
FIG. 24 depicts an E-Commerce Planning Semantic Network with added weights according to an embodiment of the present invention.

FIG. 24 depicts an E-Commerce Planning Semantic Network with added weights. For each link, weights are assigned for the formula on that link, and on the link itself if it does not have a formula. If no weight is specified, it is assumed to be some default value. Weights are also assigned to each node in the network. A link formula may have either a conditional weight, a prior weight or both. The conditional weight on a formula on a link (or the link if no formula) quantifies the strength of the relationship described by the link, given that the state described by the node at the start of the link is known to be valid. For example, in FIG. 24, a weight of 0.92 (24301) denoted by w on link 16111 represents the fact that given that the state described by node 16100, tax-deferred investment products, is valid, it would be reasonable to make the inference that the state described by node 16420, tax-deferred college savings, would also be valid 92% of the time, provided the customer has a child under 18 years of age. This means that for 92% of the people for whom tax-deferred investment products are suitable, tax-deferred college savings would be an appropriate recommendation.

A prior weight on a link formula quantifies the strength of the relationship specified by the link only in the case in which the validity of the formula on the link is not known. For example, the conditional weight of 0.64 (24301) denoted by cw on link 16111 represents the belief that tax-deferred college savings would be appropriate for 64% of the people in the entire customer-universe for whom tax-deferred investment products are suitable, given that it is not known whether the customer has a child under 18 years or not.

Weights are also assigned to product nodes in order to quantify the appropriateness of recommending that product to a customer from the point of view of the business, due to business reasons such as profitability. Thus a weight of 40 (24322) assigned to node 401K (24321) signifies that it is a better recommendation for a customer, from the business's point of view, than a product such as an IRA (node 24322) that has a lower weight 24324 of 20.

Combining weights assigned to formulae and nodes along various legal paths in the network during reasoning allow the system to quantify the strength on the inferences that are made as a result of traversing those paths. Thus, it allows one to decide between multiple legal paths of inference to decide which ones are, in a sense, "more valid" than others. Besides helping decide what products are more appropriate to recommend to the customer given the current information about him or her, this can also significantly reduce the complexity of the reasoning process by helping to guide reasoning only along paths that have more validity as opposed to paths of weaker inferential strength.

Figure 25:
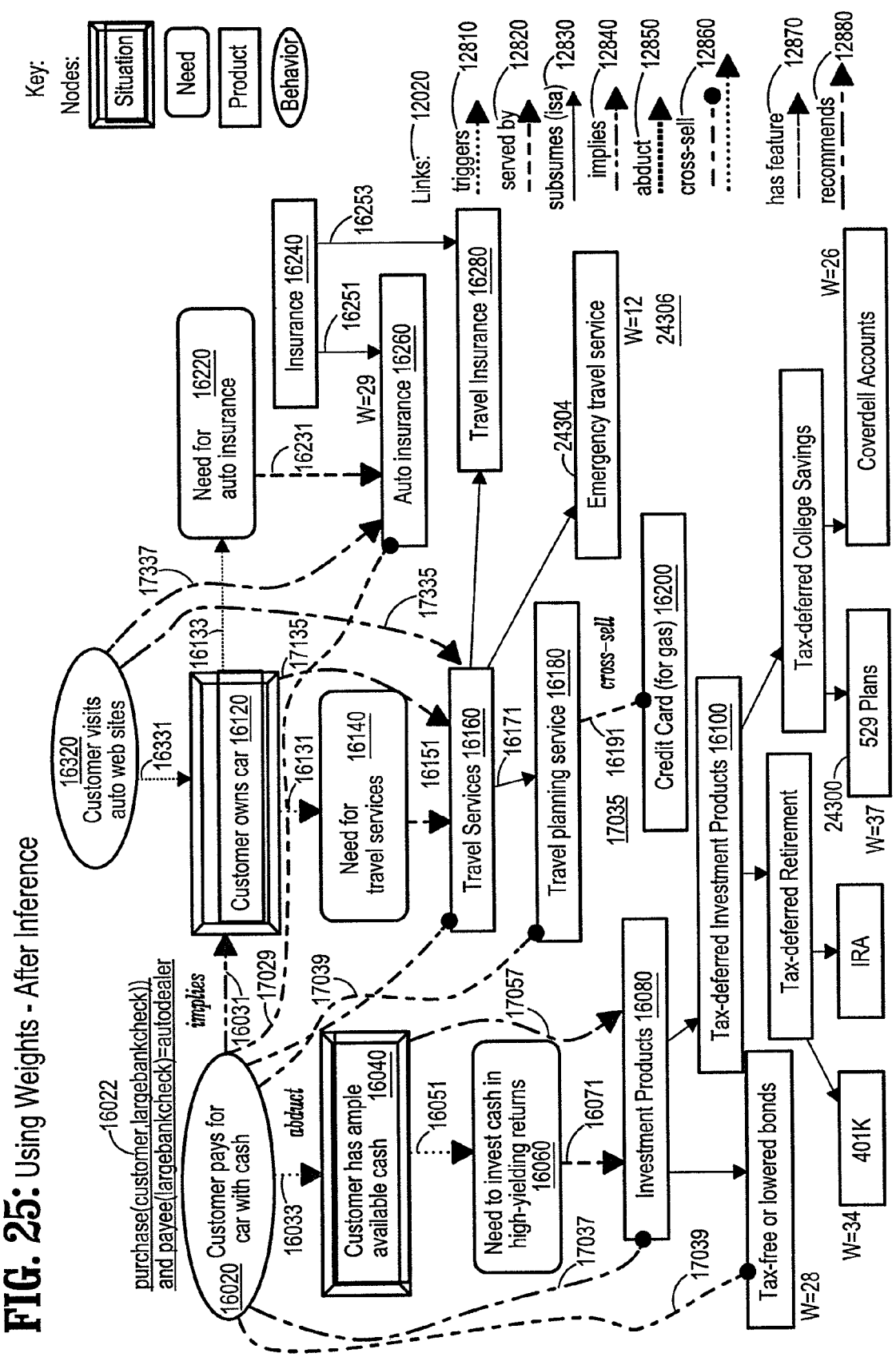
FIG. 25 depicts an E-Commerce Planning Semantic Network using weights after inference according to an embodiment of the present invention.

FIG. 25 depicts the way in which recommendation weights are calculated for various recommendations using the weights on formulae links and nodes along all the legal paths traversed by the reasoning engine. Thus, node 24300, 529 plans, has the highest recommendation weight 24302 of 37, while node 24304, Emergency Travel Services, has the lowest weight of all the recommendations with a recommendation weight of 12 (24306). The set of recommendations arrived at by the reasoning engine are ranked according to these recommendation weights and outputted. The algorithm used to compute the recommendation weights is described in FIG. 26.

Figure 26:
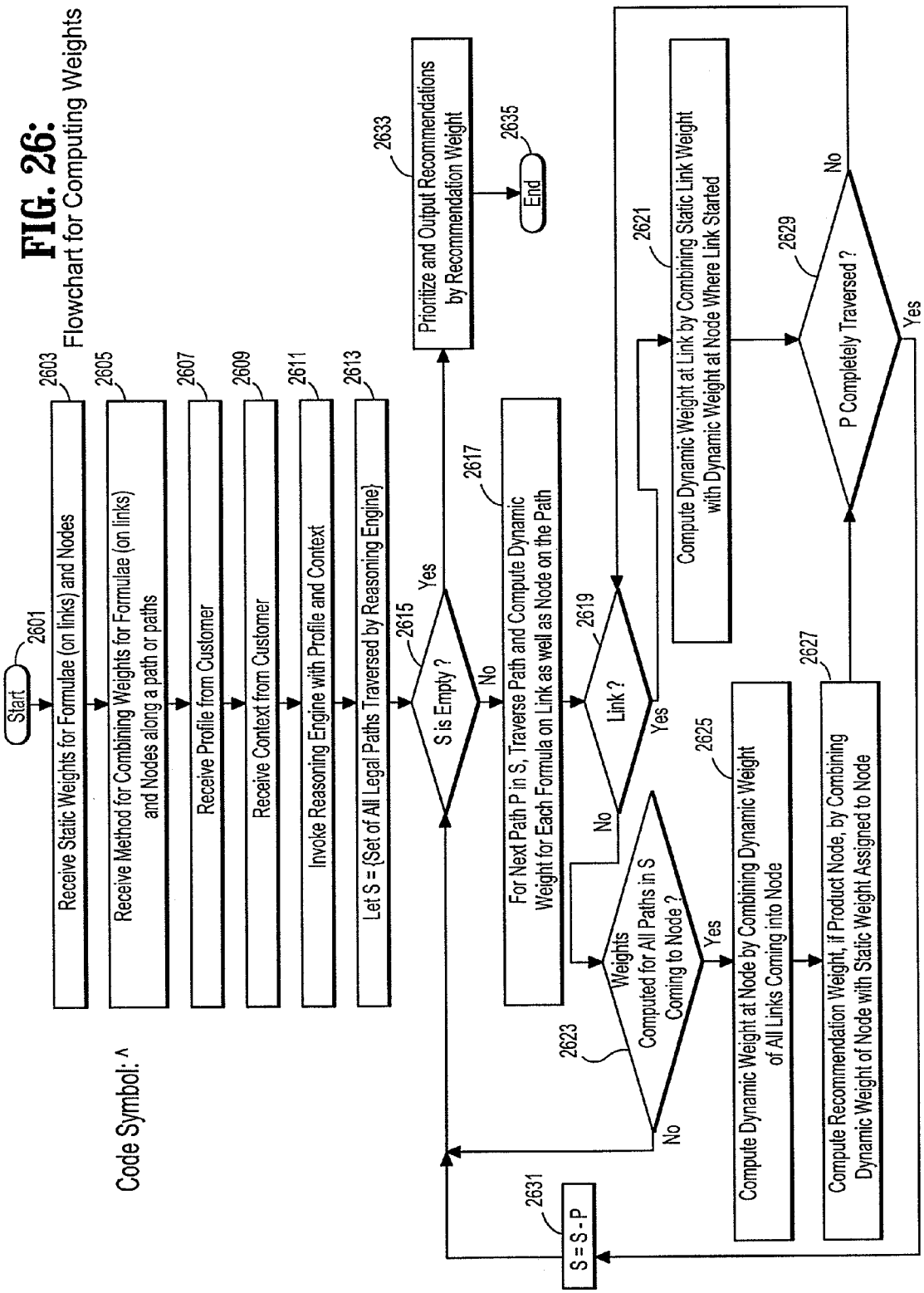
FIG. 26 depicts the manner in which recommendation weights are calculated for various recommendations.

FIG. 26 shows the flowchart of algorithmic steps for generating weighted recommendations using a set of weights assigned to nodes and link formulae in the network. It starts with step 2601. In steps 2603 and 2605, a set of Weights for nodes as well as formulae on links is received from the knowledge acquisition manager along with a Method for combining these weights in the network. In step 07, the profile is received from the Customer via the User Interface. In step 2609, the context is received from the Customer via the User Interface. In step 2611, the Reasoning Engine is invoked with the Weights received in step 2603, the Method received in 2605, the Profile received in step 2607 and the Context received in step 2609. In step 2613, the set of all legal paths traversed by the Reasoning Engine are identified as set S. Starting with step 2617, for each such path, the dynamic weights are calculated for each node and each formula on link on the path as described below. In step 2619, a check is made to see if the next item on the path is a link or a node. If it is a link, Step 2621 computes the dynamic weight of the link formulae by combining the static link weight with the dynamic weight of the node where the link started using the method of Step 2605. If, instead, in step 2619, a node is determined to be the next item on the path, then a check is made in step 2623 to see if dynamic weights have been calculated for all paths in S that are coming into the node. If not, a branch is taken back to step 2615 to continue computing dynamic weights along remaining paths. If yes, then dynamic weight at node is computed in step 2625 by combining the dynamic weights of all paths coming into node in S using method of step 2605. Furthermore, if node is a product node, recommendation weight of node is calculated in step 2627 by combining static weight of node with dynamic weight calculated in step 2625 using method in step 2605. After both steps 2621 as well as 2627, a check is made to see if the entire path has been traversed. If not, a branch is taken back to step 2619 to continue computation along the path. If yes, a branch is taken back to step 2615 to compute dynamic weights along next path. When all paths in S have been traversed and dynamic weights have been calculated for all nodes and formulae on links on those paths, the recommendations are ordered by their recommendation weights in Step 2633 and outputted. The flowchart then terminates in Step 2635.

Figure 27:
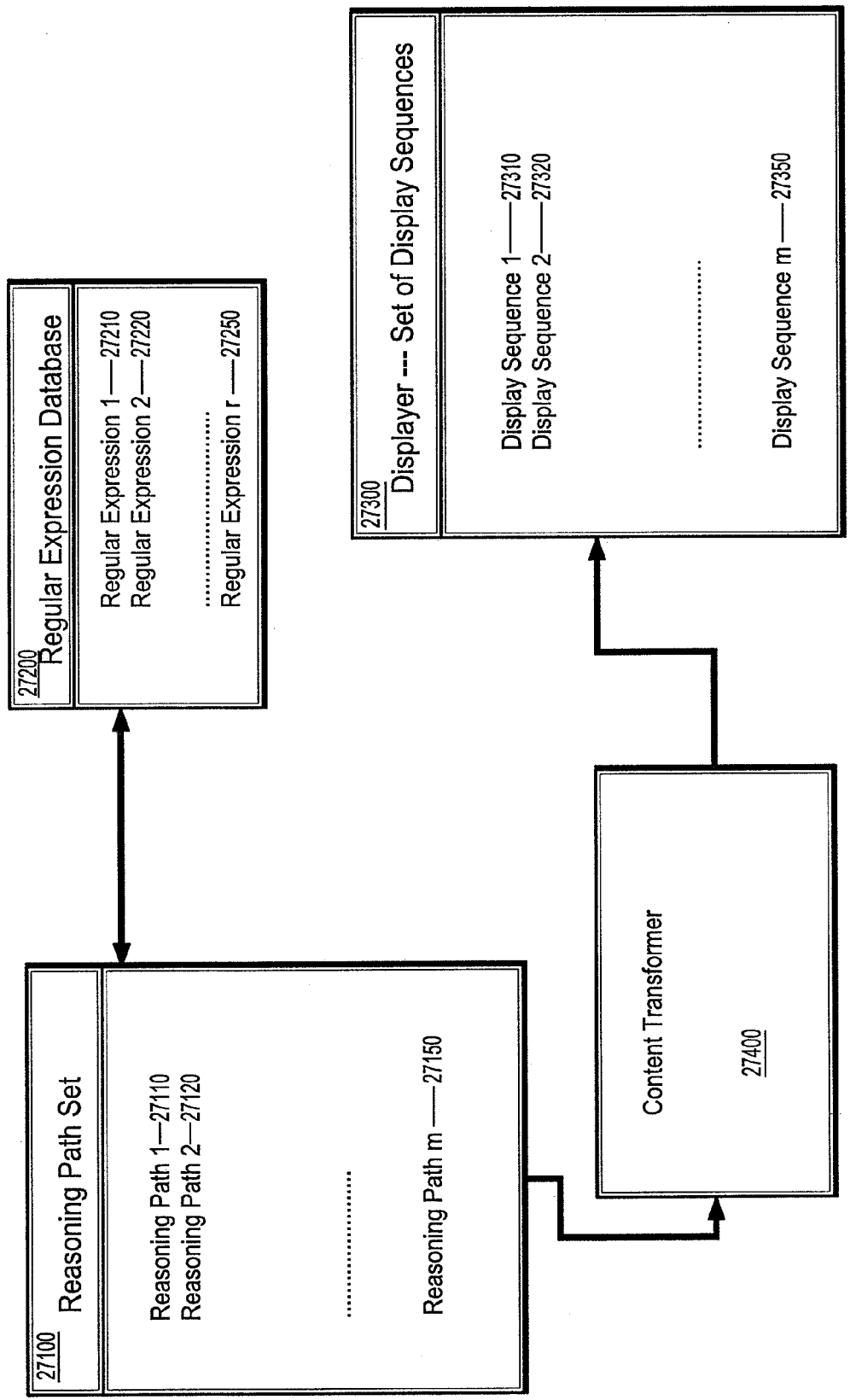
FIG. 27 depicts an overview of a server system comprising a reasoning path set, a regular expression database, a content transformer, and a displayer.

FIG. 27 depicts an overview of a server system comprising a reasoning path set (27100), a regular expression database (27200), a content transformer (27400), and a displayer (27300). The reasoning path set comprises n reasoning paths. The figure shows 3 of these reasoning paths: Reasoning Path 1(27110), Reasoning Path 2 (27120), and Reasoning Path n (27150). The regular expression database having a set of regular expressions which match the paths in the reasoning path set. Three regular expressions (27210, 27220, 27250) are depicted in the figure. Note that the number of regular expressions is not equal to the number of reasoning paths; there are n reasoning paths and r regular expressions. As will be discussed further in FIG. 6, the match between reasoning paths and regular expressions is not one-to-one. All that is required is that every path in the reasoning path set match one of the regular expressions in the regular expression database.

The displayer comprises a set of display sequences. There are as many display sequences as reasoning paths. Three display sequences (27310, 27320, 27350) are depicted in the figure. The content transformer transforms each reasoning unit to a display unit.

Figure 28:
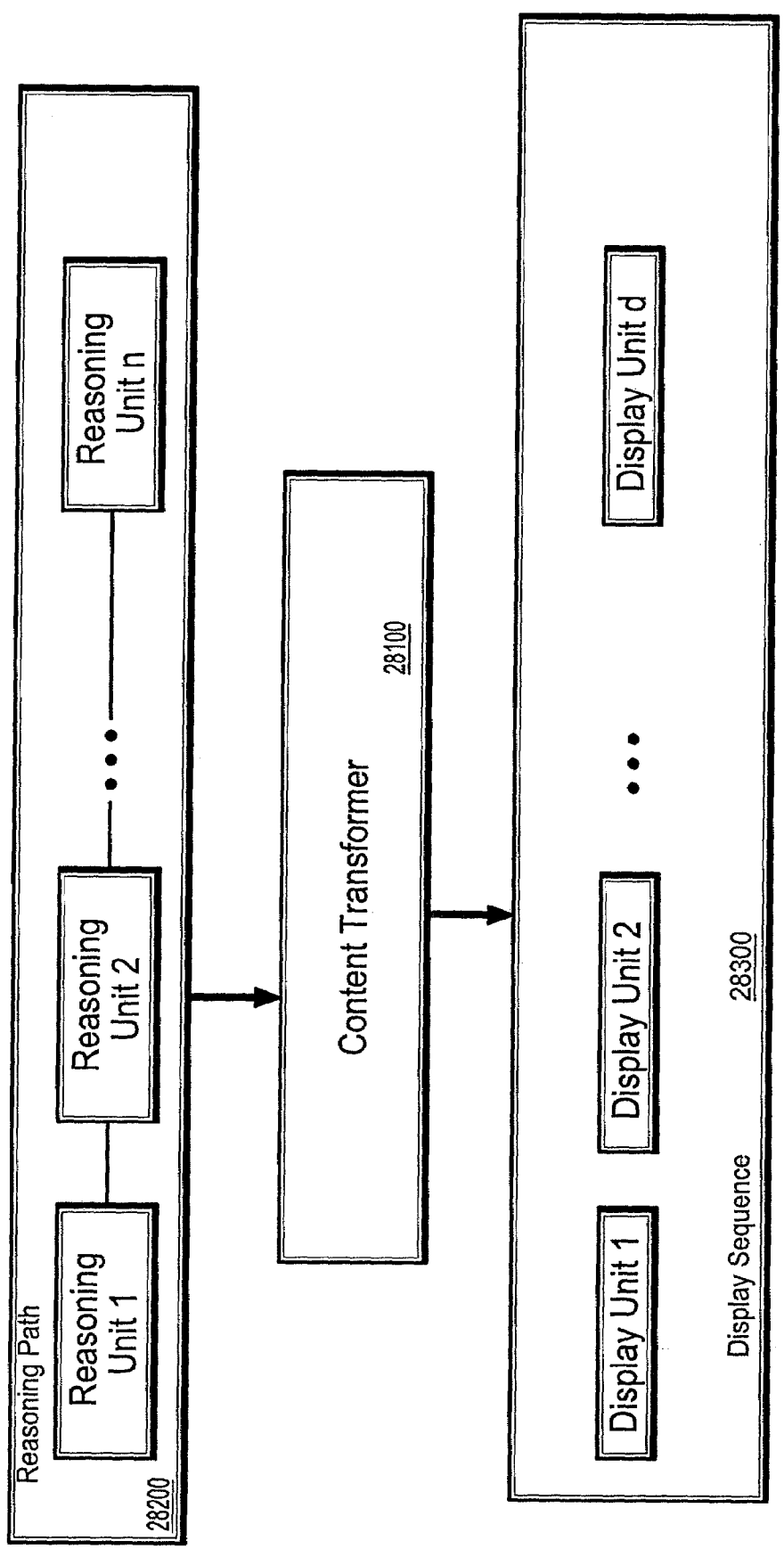
FIG. 28 depicts an action of a content transformer on a single reasoning path according to an embodiment of the present invention.

FIG. 28 depicts the action of the content transformer (28100) on a single reasoning path. The content transformer takes a single reasoning path (28200) as input and returns a single display sequence (28300) as output. Note that the number of units in the reasoning path need not be the same as the number of units in the display sequence.

Figure 29:
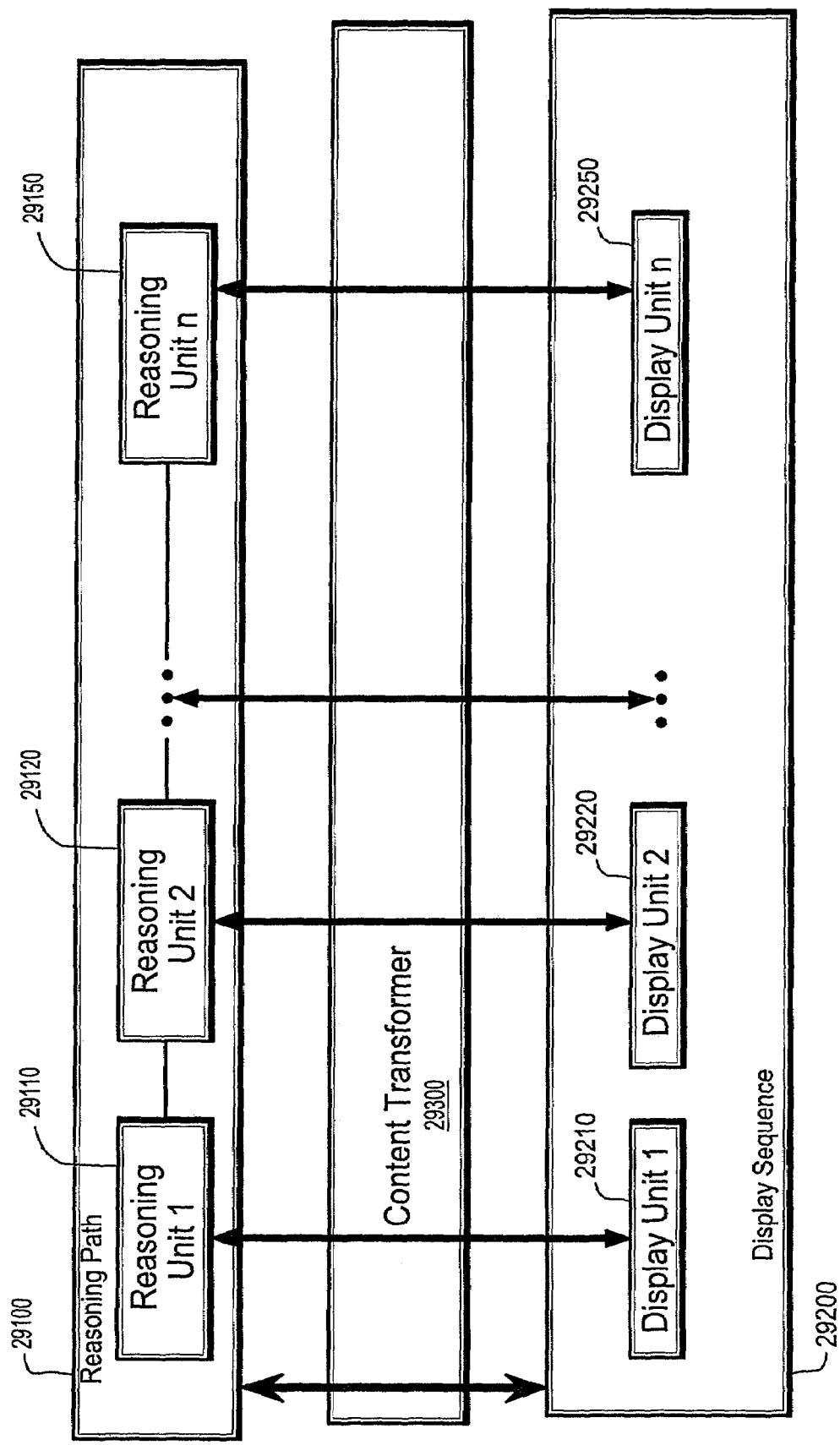
FIG. 29 depicts the workings of a content transformer where each reasoning unit in each display path is matched by one display unit in the corresponding display sequence.

FIG. 29 depicts the workings of the content transformer when each reasoning unit in each reasoning path is matched by one display unit in the corresponding display sequence. The figure depicts the internal structure of the reasoning paths and display sequences. A reasoning path (29100) comprises a sequence of n reasoning units, for some number n. In this case, the corresponding display sequence (29200) likewise comprises a sequence of n reasoning units. Each reasoning unit corresponds to exactly one display unit. The content transformer (29300) transforms each reasoning unit into exactly one display unit. (Note that the correspondence between reasoning units and display units could go both ways; because the transformation is one-to-one; in practice, however, one is more likely to use the transformer to transform reasoning units into display units). Without loss of generality, we can say that reasoning unit 1 (29110) corresponds to display unit 1, reasoning unit 2 (29120) corresponds to display unit 2(29220), and so on, with reasoning unit n (29150) corresponding to display unit n(29250). The display sequence comprises a permutation of these n display units, as the next figures show.

Figure 30:
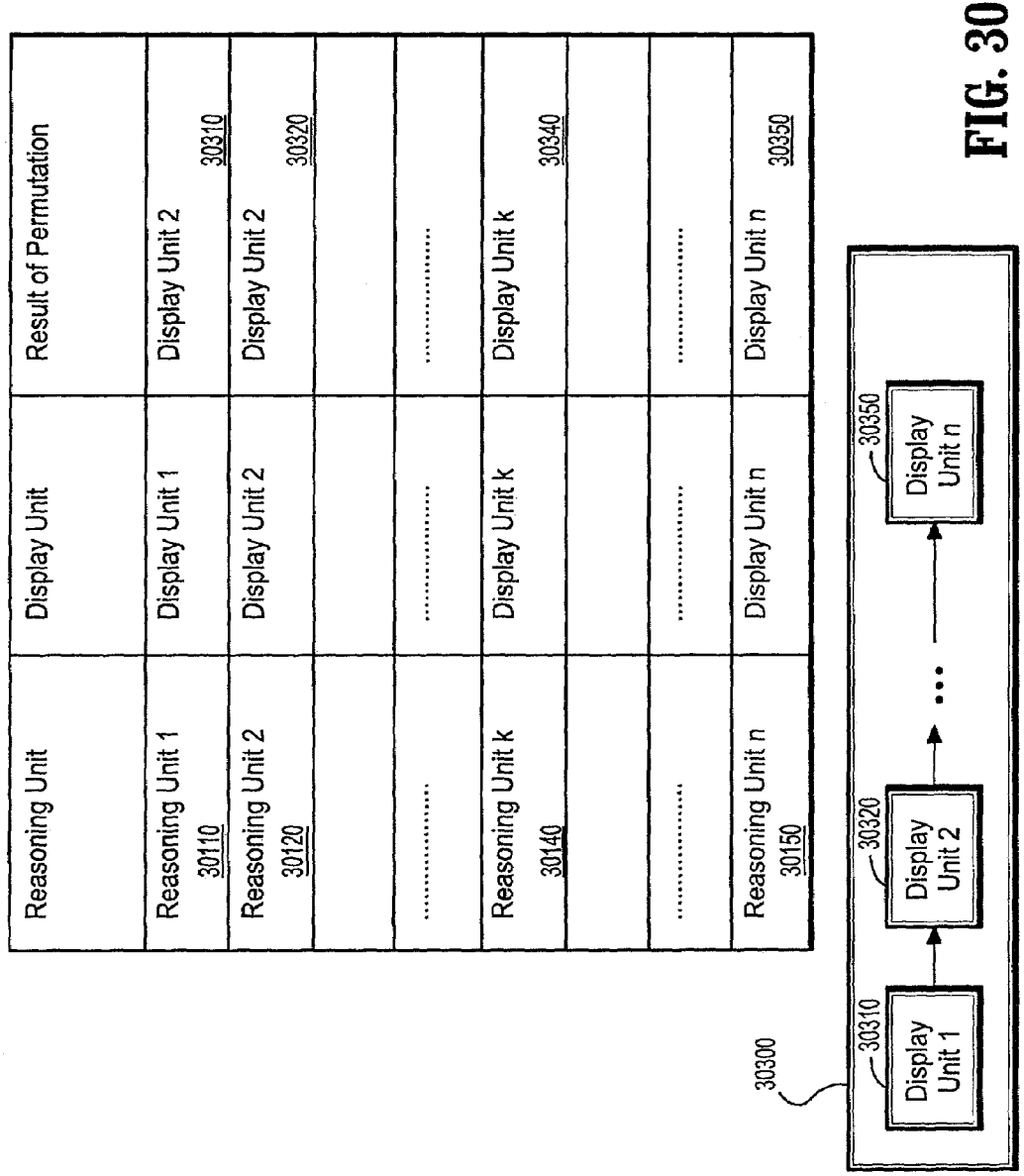
FIG. 30 depicts a display sequence of display units corresponding to reasoning units according to an embodiment of the present invention.

FIG. 30 depicts one possible display sequence of the display units corresponding to the reasoning units. In this case, the trivial (order-preserving) permutation is performed. Thus, the order of display units in the display sequence corresponds to the order of the reasoning units in the reasoning path. That is, the first unit displayed (30310) corresponds to the first reasoning unit in the reasoning path (30110); the second unit displayed (30320) corresponds to the second reasoning unit in the reasoning path (30120), and so on. This results in a forward-reasoning display sequence, which might be used to illustrate the consequences of some set of assumptions.

Figure 31:
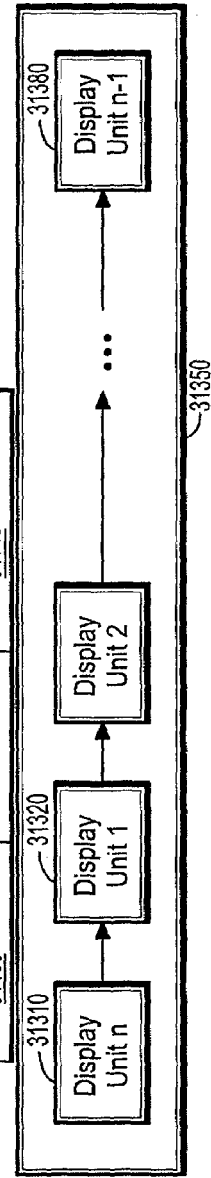
FIG. 31 depicts a display sequence that has an order corresponding to a wraparound permutation of reasoning units in a corresponding reasoning path.

FIG. 31 depicts a display sequence whose order corresponds to a wraparound permutation of the reasoning units in the corresponding reasoning path. That is, the first unit displayed (31310) is Display Unit n (corresponds to the second reasoning unit (31120), the second unit displayed (31230) corresponds to the third reasoning unit (31130), and so on, with the nth (last) unit displayed (31210) corresponding to the first reasoning unit (31110). This example illustrates that any permutation is a legitimate embodiment of this invention, although such common permutations as order-preserving (previous figure) and order-reversing (next figure) are likely to be most useful for the purposes of explanation.

FIG. 32 depicts a display sequence whose order corresponds to a reverse ordering of the reasoning units in the corresponding reasoning path. That is, the first unit displayed (Unit n) (32310) corresponds to the last reasoning unit (32190), the second unit displayed (32320) corresponds to the second-to-last reasoning unit (32180), and so on, with the last unit displayed (32390) corresponding to the first reasoning unit (32110). This results in a backward-reasoning display sequence, which might be used to illustrate an explanation of some fact that is deduced. FIG. 33 depicts a sample table showing a set of reasoning paths (33100) and the corresponding reasoning type database (33200). Each reasoning path matches one or more regular expressions of the reasoning type database. Note that the number of reasoning paths need not be equivalent to the number of regular expressions in the reasoning type database. In this example, there are 22 reasoning paths (not all shown) and 5 regular expressions. Note that only 4 of the regular expressions are matched by the reasoning paths shown. Reasoning paths 6 (33160) and 22 (33190) matches regular expression 1 (33260,33290)); reasoning paths 4 (33140) and 5 (33150) match regular expression 2 (33240, 33250); reasoning paths 1 (33110) and 3 (33130) match regular expression 3 (33210, 33230); reasoning path 2 (33120) matches regular expression 5 (33220). Regular expression 4 is not matched. Furthermore, a regular expression can be matched multiple times.

Figure 34:
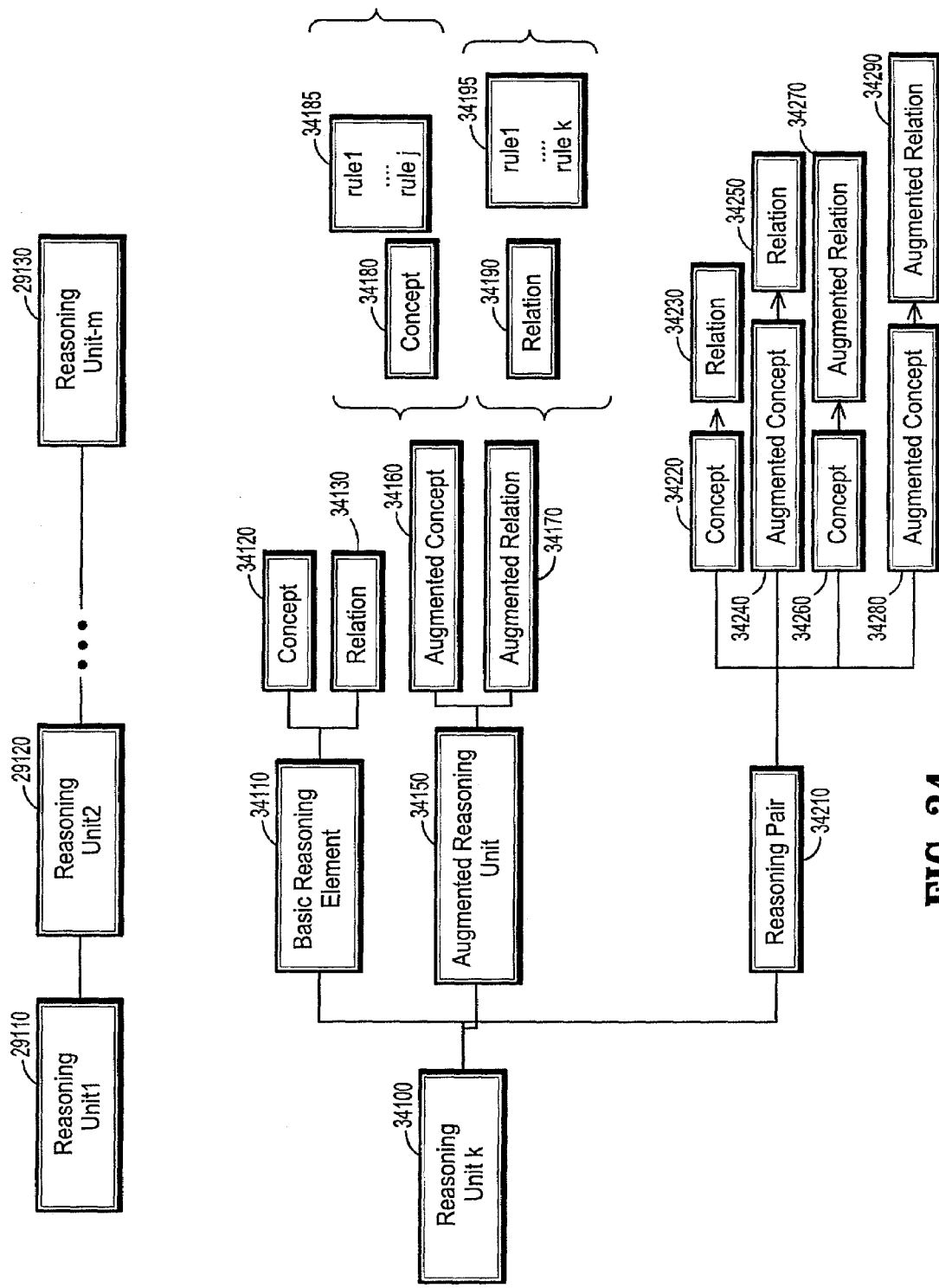
FIG. 34 depicts an internal structure of a reasoning unit according to an embodiment of the present invention.

FIG. 34 depicts a possible internal structure of a reasoning unit. In this embodiment, any reasoning unit (34100) can be either a basic reasoning element (34110), an augmented reasoning element (34150), or a reasoning pair (34210). A basic reasoning element, in turn can be either a concept (34120) or a relation(34130).

An augmented reasoning element can be either an augmented concept (34160) or an augmented relation (34190). An augmented concept is a set comprising a concept and a set of rules (34180,34185). An augmented relation is a set comprising a relation and a set of rules (34190, 34195).

A reasoning pair is a sequence of first, either a concept or an extended concept, and second, either a relation or an augmented relation. This gives 4 possible pair-types: a sequence of a concept and a relation (34220, 34230), a sequence of an augmented concept and a relation (34240, 34250), a sequence of a concept and an augmented relation (34260, 34270), and a sequence of an augmented concept and an augmented relation (34280, 34290).

Figure 35:
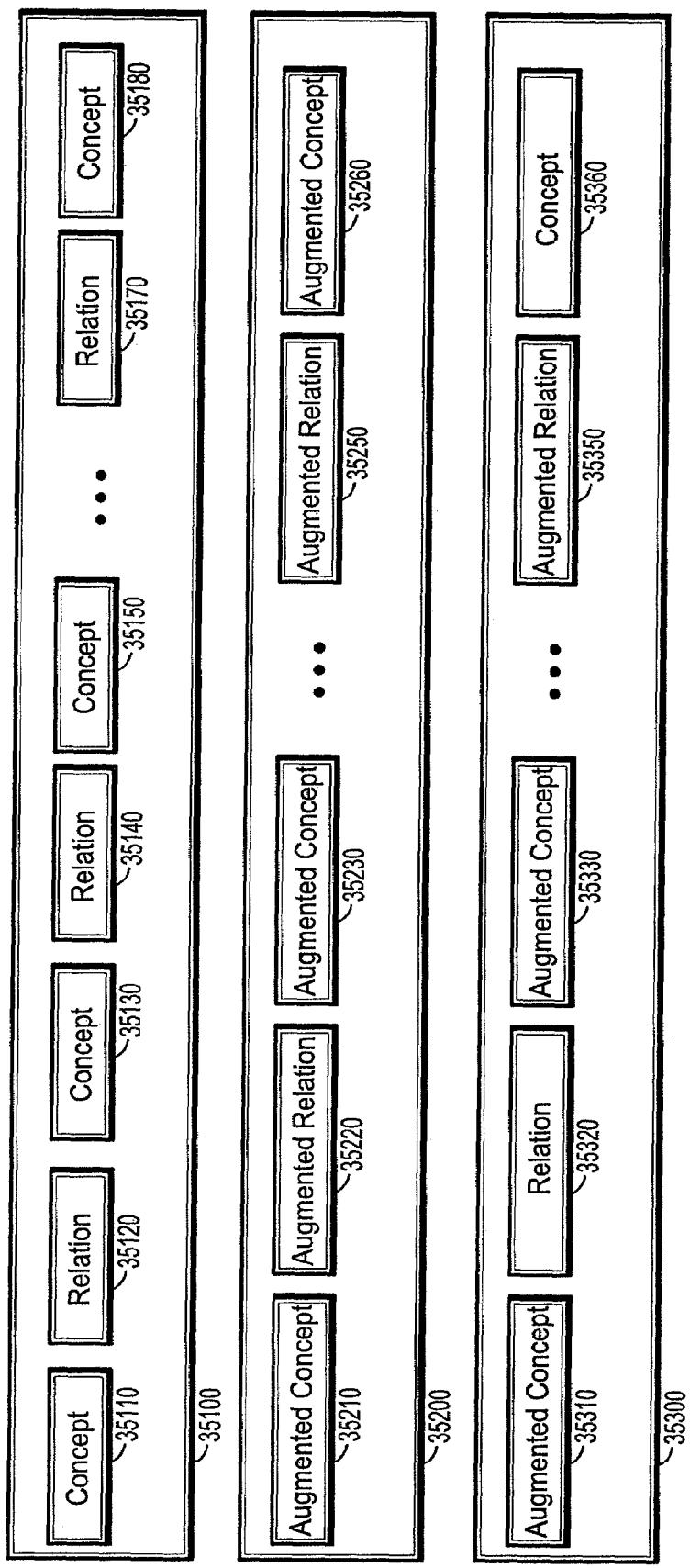
FIG. 35 depicts sample paths in a preferred embodiment according to the present invention.

FIG. 35 depicts sample paths in one preferred embodiment. In this embodiment, all reasoning paths begin with a concept or an augmented concept and are followed by reasoning pairs. The top reasoning path (35100) comprises only concepts and relations; the middle reasoning path (35200) comprises only augmented concepts and augmented relations; the bottom reasoning path comprises a mixture of concepts, relations, augmented concepts, augmented relations.

FIG. 36 depicts two examples of reasoning paths in an e-commerce setting. These reasoning paths are legal and valid paths from the E-Commerce Planning Semantic Network in Current FIG. 10. In these examples, each reasoning path comprises a concept followed by a reasoning pair which comprises concepts and relations. Concepts here correspond to the nodes of Current FIG. 10; while relations correspond to the links of Current FIG. 10.

The first reasoning path (36100) starts from the situation of a customer having ample available cash (36110). This triggers the need to invest cash in high-yielding investments (36120, 36130). This need, in turn, is served by investment products (36140, 36150), which subsumes tax-free or lowered bonds (36160, 36170).

The second reasoning path (36300) starts from the situation of a customer having a car (36310). This triggers the need to insure the car (36320,36330), which is served by comprehensive collision insurance (36340, 36350).

FIG. 37 depicts two example transformation tables that can be used by the content transformer to transform subsequences of reasoning paths to subsequences of display sequences. These tables are designed for using on the reasoning paths in e-commerce settings, for example, in E-Commerce Planning Semantic Networks (FIGS. 16, 17). The first transformation table (37100) could be used to transform reasoning paths into English-like explanations that can be used to demonstrate forward reasoning. The transformation table comprises context-sensitive products that transform segments of the reasoning path into sequences of English words. For example, consider the second line of the table (37120). This line means that any segment of a reasoning path of the form x Served by y will be transformed into an English phrase of the form: Your x might be served by purchasing y. For example, in the first reasoning path of FIG. 9, the segment of the reasoning path: Need to invest in high-yielding returns Served by Investment Products is transformed into: Your need to in invest in high-yielding returns might be served by purchasing investment products.

The second transformation table (37200) could be used to transform reasoning paths into English-like explanations that can be used to demonstrate backward chaining. For example, consider the first line of the table (37210). This line means that the final node of a reasoning path, where that node is a product node, will be transformed into an English phrase of the form: We are recommending <product> because: For example, in the first reasoning path of FIG. 9, the segment of the reasoning path: Tax-free or lowered bonds Will be transformed into: We are recommending tax-free or lowered bonds because . . . . In this manner, and using suitable products, reasoning paths can be transformed into English-like explanations, as the next figure indicates.

FIG. 38 depicts the display sequences that would be returned by using the transformation tables of FIG. 37 on the reasoning paths of FIG. 9.

Figure 39:
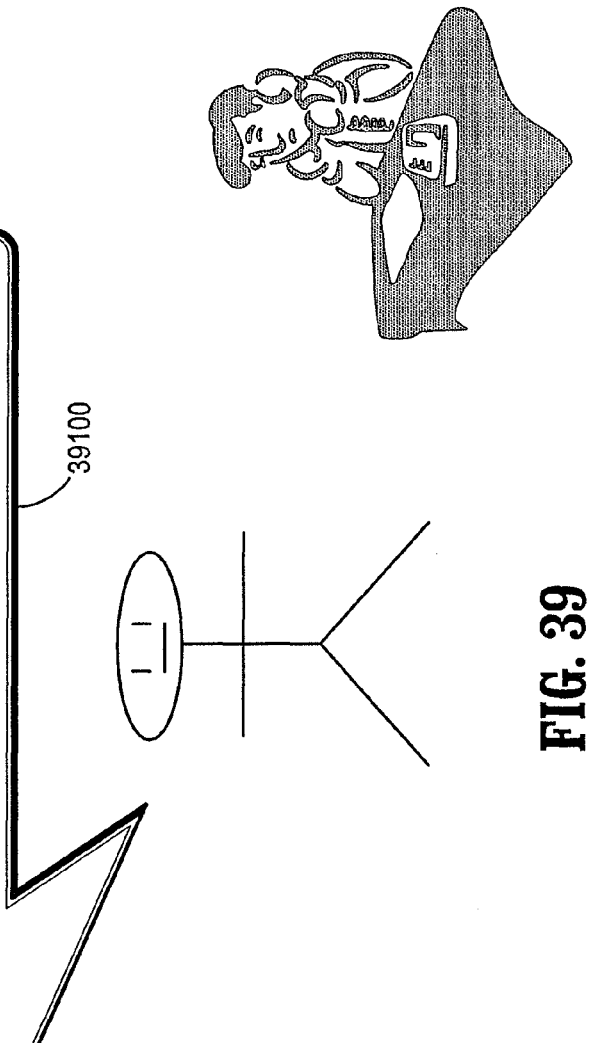
FIG. 39 depicts a second display sequence of FIG. 38.

FIG. 39 depicts the second display sequence of FIG. E38. Whereas the display sequences of FIG. 38 contained text, the display sequence in this figure comprises voice data. Other possible media for the contents of the display sequences include but are not limited to graphics, video, and combinations of text, voice, graphics, and video.

Figure 40:
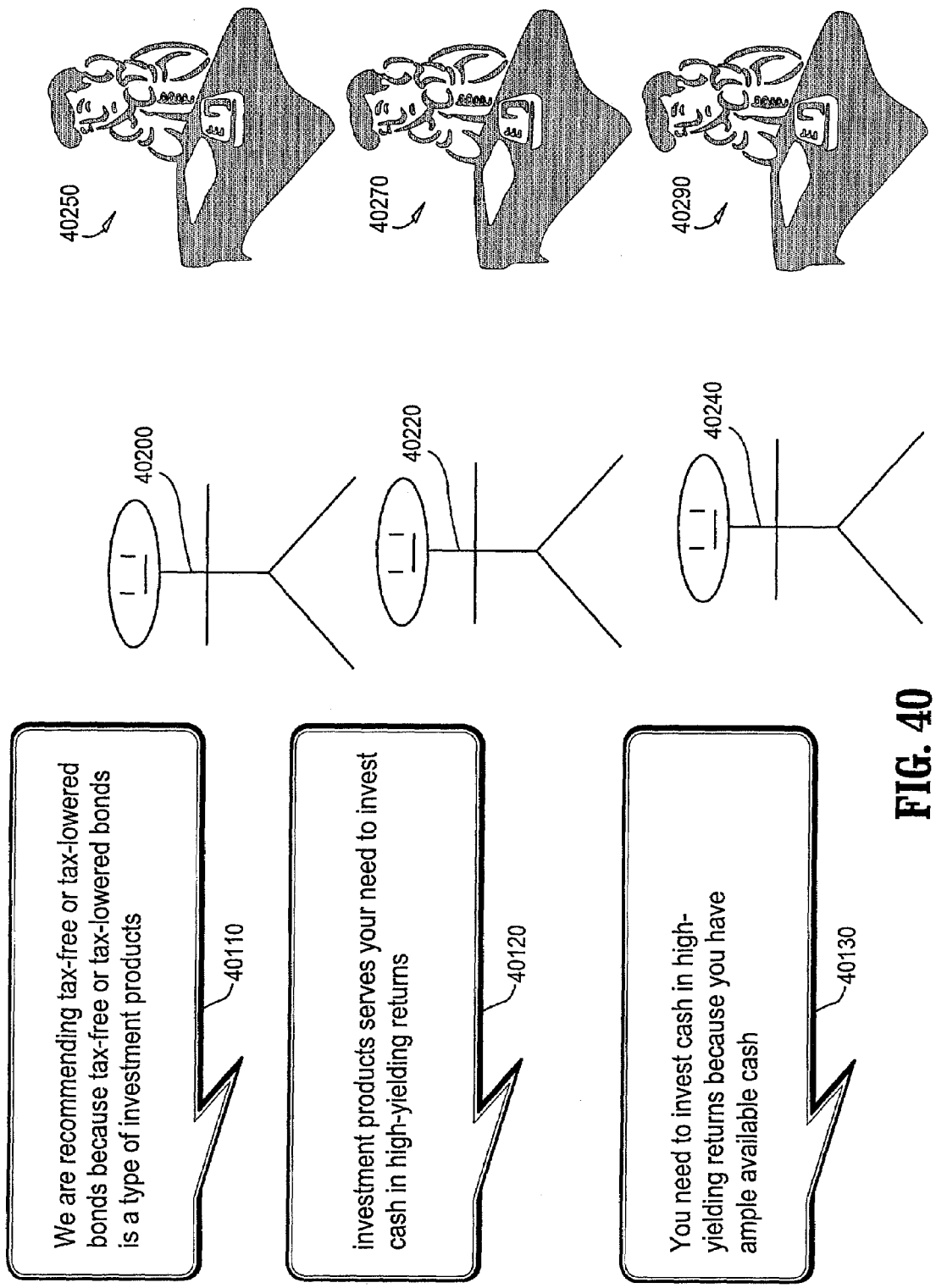
FIG. 40 depicts a display sequence of FIG. 39.

FIG. 40 depicts the display sequence of FIG. 12. Whereas the display sequence of FIG. 12 was transmitted to the client server as a single unit, this display sequence is transmitted in segments. (40110,40120,40130).

Figure 41:
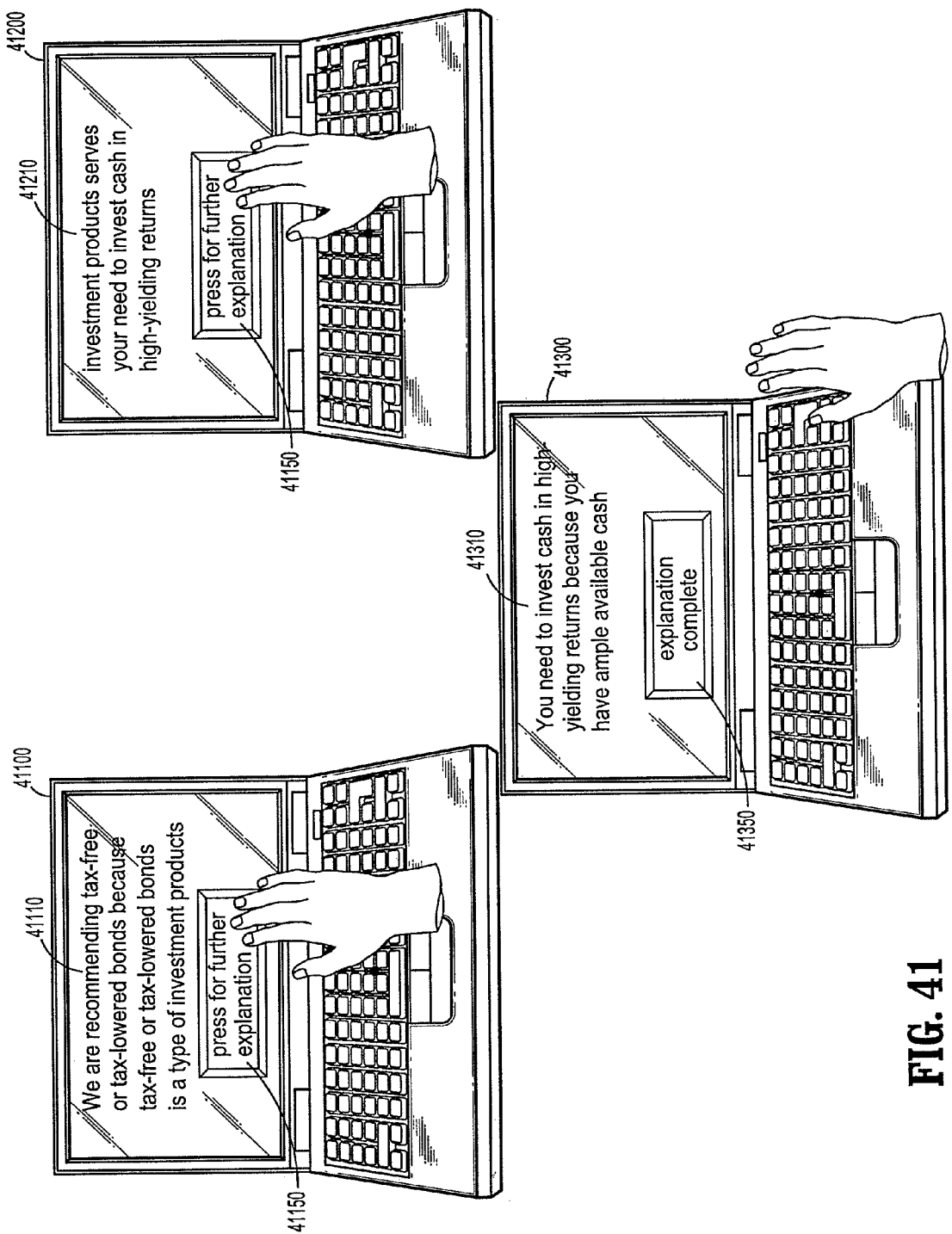
FIG. 41 depicts a display sequence of FIG. 40.

FIG. 41 depicts the display sequence of FIG. 13. Segments of the display sequence (41110, 41210, 41310) are transmitted to the user per user request. Thus, the segments are produced over several instants of time. (41100, 41200, 41300). The user requests a segment by pushing a button (41150) on the computer screen. A button indicates when the display sequence is complete (41350).

The teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more Central Processing Units ("CPUs"), a Random Access Memory ("RAM"), and Input/Output ("I/O") interfaces. The computer platform may also include an operating system and micro instruction code. The various processes and functions described herein may be either part of the micro instruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A computer processing system comprising:
an electronic commerce network;
a computer server coupled to one or more users across the electronic commerce network; and
an enhanced semantic network system which runs on the computer server, wherein the computer server includes at least one processor (CPU) for controlling the server and a memory storage system which acts as a repository for the enhanced memory network system, wherein the at least one processor (CPU) uses information from the enhanced memory network system to reason with a given need or situation of the one or more users and generate a response back across the electronic commerce network to a request from the one or more users in the form of a suggested action for addressing the given need or situation of the one or more users, and
wherein the enhanced network system comprises:
a semantic network comprising at least one of a plurality of nodes from a predetermined set of node types, at least one of a plurality of links from a predetermined set of link types, and rules from a predetermined set of rule types, a subset of the rule types being matching rule types, each node and each link being associated with a of rules;
a network reasoning data structure comprising a reasoning type database having at least one of a plurality of regular expressions corresponding to reasoning types supported by enhanced network system and a context representing situation specific information in the form of a set of rules; and
a reasoning engine comprising an activator for selecting points in the semantic network at which the reasoning process for addressing the one or more users needs or situation begins, a validator for choosing paths as valid paths in the enhanced network system that match the context of the network reasoning data structure; and a legal inferencer for choosing from the valid paths in the enhanced network system that match one or more of the reasoning types in the reasoning type database, and wherein the network reasoning data structure contains auxiliary information that is used by the reasoning engine to perform the reasoning for the given need or situation of the one or more users.

2. The computer system of claim 1, wherein electronic commerce network is a subset of the World Wide Web.

3. The computer system of claim 1, wherein the computer system is adapted to run a business application which suggests a product or service to a consumer to purchase.

4. The computer system of claim 3, wherein the computer system is adapted to run a banking application which suggests a product or service to a consumer to purchase.

5. The computer system of claim 1, wherein the enhanced semantic network system is in an e-commerce domain.

6. The computer system of claim 1, wherein the memory storage system comprises one or more of a main memory, cache memory or a disk drive subsystem.

7. A computer system as in claim 1, wherein the node types include any one or more of a behavior node, an action node, a situation node, a needs node, and a methods node.

8. A computer system as in claim 1, wherein the link types include any one or more of causes, triggers, served by, subsumes, leads to, retroduct, and has-method.

9. A computer system as in claim 8, wherein the regular expression sequences include any one or more of Situation (ImpliesSituation)*TriggersNeedServedByProduct(Subsum- esProduct)*, Need(SubsumesNeed)*ServedByProduct (SubsumesProduct)*, (BehaviorRetroductSituation|BehaviorCausesSituation) (ImpliesSituation)*Tr-iggersNeedServedByProduct(SubsumesProduct)*, Product(IsaProduct)CausesSitu- ation(ImpliesSituation)*, ProductCausesSituation(ImpliesSituation) *TriggersNeed, ProductCausesSituation(ImpliesSituation) *TriggersNeedServedByProduct(SubsumesPro duct)*, Product(IsaProduct)*ServesNeed(IsaNeed)*, Product(SubsumesProduct)*, Situation(ImpliesSituation)*TriggersNeedServedByProduct,Need(SubsumesNeed)* ServedByProduct, BehaviorRetroductSituation|BehaviorCausesSituation) (ImpliesSituation)*Trig gersNeedServedByPr- oduct, and Product(SubsumesProduct).

10. A computer system as in claim 1, wherein the reasoning type database contains one or more reasoning pairs, each reasoning pair having one of the regular expressions and an associated derived link.

11. A computer system as in claim 1, wherein the reasoning type database contains one or more reasoning pairs, each reasoning pair having one of the regular expressions and an associated derived link and the legal inferencer associating the derived link with the activated path that contains the associated regular expression.

* * * * *